US012188355B2

(12) United States Patent
Ignatiev et al.

(10) Patent No.: US 12,188,355 B2
(45) Date of Patent: Jan. 7, 2025

(54) DRIVESHAFT ASSEMBLIES AND COMPRESSORS INCLUDING THE SAME

(71) Applicant: Copeland LP, Sidney, OH (US)

(72) Inventors: Kirill Michailovich Ignatiev, Oakwood, OH (US); Mikhail A. Antimonov, Beavercreek, OH (US); Robert Christopher Stover, Versailles, OH (US)

(73) Assignee: Copeland LP, Sidney, OH (US)

( * ) Notice: Subject to any disclaimer, the term of this patent is extended or adjusted under 35 U.S.C. 154(b) by 0 days.

(21) Appl. No.: 18/175,147

(22) Filed: Feb. 27, 2023

(65) Prior Publication Data

US 2024/0287904 A1    Aug. 29, 2024

(51) Int. Cl.
*F04C 29/00* (2006.01)
*F01C 21/02* (2006.01)
*F04C 18/02* (2006.01)
*F04D 29/66* (2006.01)
*F16C 3/02* (2006.01)
(Continued)

(52) U.S. Cl.
CPC .......... *F01C 21/02* (2013.01); *F04C 18/0215* (2013.01); *F04C 29/0028* (2013.01); *F04C 29/0057* (2013.01); *F04C 29/0071* (2013.01); *F04C 29/0078* (2013.01); *F16C 3/023* (2013.01); *F16C 3/18* (2013.01); *F16C 9/00* (2013.01); *F04C 2240/30* (2013.01); *F04C 2240/40* (2013.01); *F04C 2240/56* (2013.01); *F04C 2240/60* (2013.01); *F04C 2240/807* (2013.01); *F04D 29/66* (2013.01); *F16C 2226/50* (2013.01)

(58) Field of Classification Search
CPC .. F01C 21/02; F04C 18/0215; F04C 29/0028; F04C 29/0057; F04C 29/0071; F04C 29/0078; F04C 2240/30; F04C 2240/40; F04C 2240/56; F04C 2240/60; F04C 2240/807; F16C 3/023; F16C 3/18; F16C 9/00; F16C 2226/50; F04D 29/66
See application file for complete search history.

(56) References Cited

U.S. PATENT DOCUMENTS

| | | |
|---|---|---|
| 3,924,977 A | 12/1975 | McCullough |
| 3,994,636 A | 11/1976 | McCullough et al. |
| 4,898,520 A | 2/1990 | Nieter et al. |

(Continued)

FOREIGN PATENT DOCUMENTS

| | | | | |
|---|---|---|---|---|
| DE | 102018203675 A1 | * | 9/2019 | ........... F16D 1/0852 |
| WO | 2019168526 A1 | | 9/2019 | |
| WO | 2021038258 A1 | | 3/2021 | |

OTHER PUBLICATIONS

English Machine translation of DE102018203675A1 via USPTO Fit database (Year: 2019).*

(Continued)

*Primary Examiner* — Dominick L Plakkoottam
*Assistant Examiner* — Paul W Thiede
(74) *Attorney, Agent, or Firm* — Armstrong Teasdale LLP

(57) ABSTRACT

A driveshaft assembly for a compressor includes an unloader assembly and a driveshaft. The unloader assembly includes an unloader and a counterweight. The unloader assembly is rotationally supported by a bearing. The unloader includes a flank surface that is slidably engaged with a flank surface on the driveshaft.

21 Claims, 23 Drawing Sheets

(51) Int. Cl.
*F16C 3/18* (2006.01)
*F16C 9/00* (2006.01)

(56) References Cited

U.S. PATENT DOCUMENTS

| | | | |
|---|---|---|---|
| 5,011,384 | A | 4/1991 | Grunwald et al. |
| 5,017,107 | A | 5/1991 | Fraser, Jr. et al. |
| 7,467,933 | B2 | 12/2008 | Ni |
| 9,115,718 | B2 | 8/2015 | Ignatiev et al. |
| 9,377,022 | B2 | 6/2016 | Ignatiev et al. |
| 9,605,676 | B2 | 3/2017 | Ignatiev et al. |
| 9,695,823 | B2 | 7/2017 | Berning |
| 10,830,236 | B2 | 11/2020 | Ignatiev et al. |
| 2014/0205484 | A1* | 7/2014 | Ignatiev .............. F04C 18/0215 418/55.3 |
| 2015/0118089 | A1* | 4/2015 | Berning .............. F04C 18/0215 418/55.5 |
| 2020/0332797 | A1 | 10/2020 | Hahn et al. |

OTHER PUBLICATIONS

Nieter, J.J. and Barito, T., (1990) "Dynamics of Compliance Mechanisms in Scroll Compressors, Part I: Axial Compliance," International Compressor Engineering Conference, Paper 719. http://doc.lib.purdue.edu/icec/719.

Nieter, J.J., (1990) "Dynamics of Compliance Mechanisms in Scroll Compressors, Part II: Axial Compliance," International Compressor Engineering Conference, Paper 720. http://doc.lib.purdue.edu/icec/720.

Zhu, J., Wang. D., (1994) "Dynamical Analysis of Scroll Compressor with the Compliant Crank Mechanism," International Compressor Engineering Conference, Paper 1022. http://doc.lib.purdue.edu/icec/1022.

PCT International Search Report and Written Opinion issued by the International Searching Authority issued in PCT/US2024/014163 mailed on May 16, 2024, pp. 1-26.

* cited by examiner

DRIVESHAFT ASSEMBLIES AND COMPRESSORS INCLUDING THE SAME

FIELD

The field relates generally to systems and methods for driveshaft assemblies and compressors, and more particularly, to driveshaft assemblies including an unloader assembly for use in compressors.

BACKGROUND

Scroll compressors compress refrigerant using a scroll assembly including a non-orbiting scroll member and an orbiting scroll member that cooperate to form sealed pockets therebetween. During operation of the scroll compressor, motion of the orbiting scroll member relative to the non-orbiting scroll member continuously changes the volume of the sealed pockets to compress refrigerant within.

Scroll compressors typically include bearings that support rotations of the driveshaft and a drive bearing assembly for transmitting rotational motion from the driveshaft to orbital motion of the orbiting scroll member. The drive bearing assembly is positioned between a drive coupling of an orbiting scroll member and an eccentric portion of the driveshaft. The drive bearing assembly enables the eccentric portion to rotate, applying a tangential driving force to the drive coupling, such that the orbiting scroll member will orbit relative to the non-orbiting scroll member as the driveshaft is driven to effect compression of the refrigerant within the pockets.

The driveshaft is exposed to a variety of loads resulting from driving the orbiting scroll, rotations of counterweights, rotor torque, and bearing reaction forces. Deflection of the driveshaft, resulting from these loads, is of particular concern. A "compliant" driveshaft arrangement or position may unload or reduce forces caused by driveshaft deflections. Furthermore, a compliant driveshaft arrangement may be beneficial to control leaks between scroll flank surfaces. At higher driveshaft speeds, reduction in compressor efficiency caused by friction, as well as vibrations, may be of particular concern. A "constrained" driveshaft arrangement or position may reduce friction and noise, while improving compressor efficiency.

Efficient and reliable operation of the compressor is desirable to ensure that the climate-control system in which the compressor is installed is capable of effectively and efficiently providing a cooling and/or heating effect on demand. Furthermore, addressing the driveshaft concerns, including deflections, noise, and vibrations, as described above, may increase the longevity of the compressor and the efficiency of the climate-control system.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a driveshaft assembly includes a bearing having an inner bearing surface and a driveshaft including an outer surface including a secondary surface and a flank surface. The driveshaft assembly further includes an unloader assembly. The unloader assembly includes an unloader and a counterweight. The unloader includes an inner surface and an outer surface. The outer surface is rotationally supported with the bearing inner surface and the inner surface includes a secondary surface and a flank surface. The flank surface is slidably engaged with the flank surface of the driveshaft. The counterweight is connected to the unloader and extends radially outward relative to the unloader.

In another aspect, a compressor includes a shell and a scroll assembly that is disposed within the shell. The compressor includes a non-orbiting scroll located within the shell, wherein the non-orbiting scroll includes a first opening, an orbiting scroll includes a second opening, and a driveshaft assembly. The driveshaft assembly includes a bearing having an inner bearing surface and a driveshaft including an outer surface including a secondary surface and a flank surface. The driveshaft assembly further includes an unloader assembly. The unloader assembly includes an unloader and a counterweight. The unloader includes an inner surface and an outer surface. The outer surface is rotationally supported with the bearing inner surface and the inner surface includes a secondary surface and a flank surface. The flank surface is slidably engaged with the flank surface of the driveshaft. The counterweight is connected to the unloader and extends radially outward relative to the unloader.

In another aspect, a method of assembling a driveshaft includes inserting a bearing assembly, defining a bearing opening, within an opening defined within a first hub. The method includes inserting an unloader of an unloader assembly within the bearing opening such that a counterweight of the unloader assembly is disposed outside of the bearing opening and inserting a driveshaft within an unloader opening defined by the unloader assembly, wherein a flank surface of the driveshaft is in contact with a flank surface of the unloader, and wherein a secondary surface of the driveshaft is arranged in proximity to a secondary surface of the unloader.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The following figures illustrate various aspects of the disclosure.

Corresponding reference characters indicate corresponding parts throughout the drawings.

DETAILED DESCRIPTION

Figure 1:
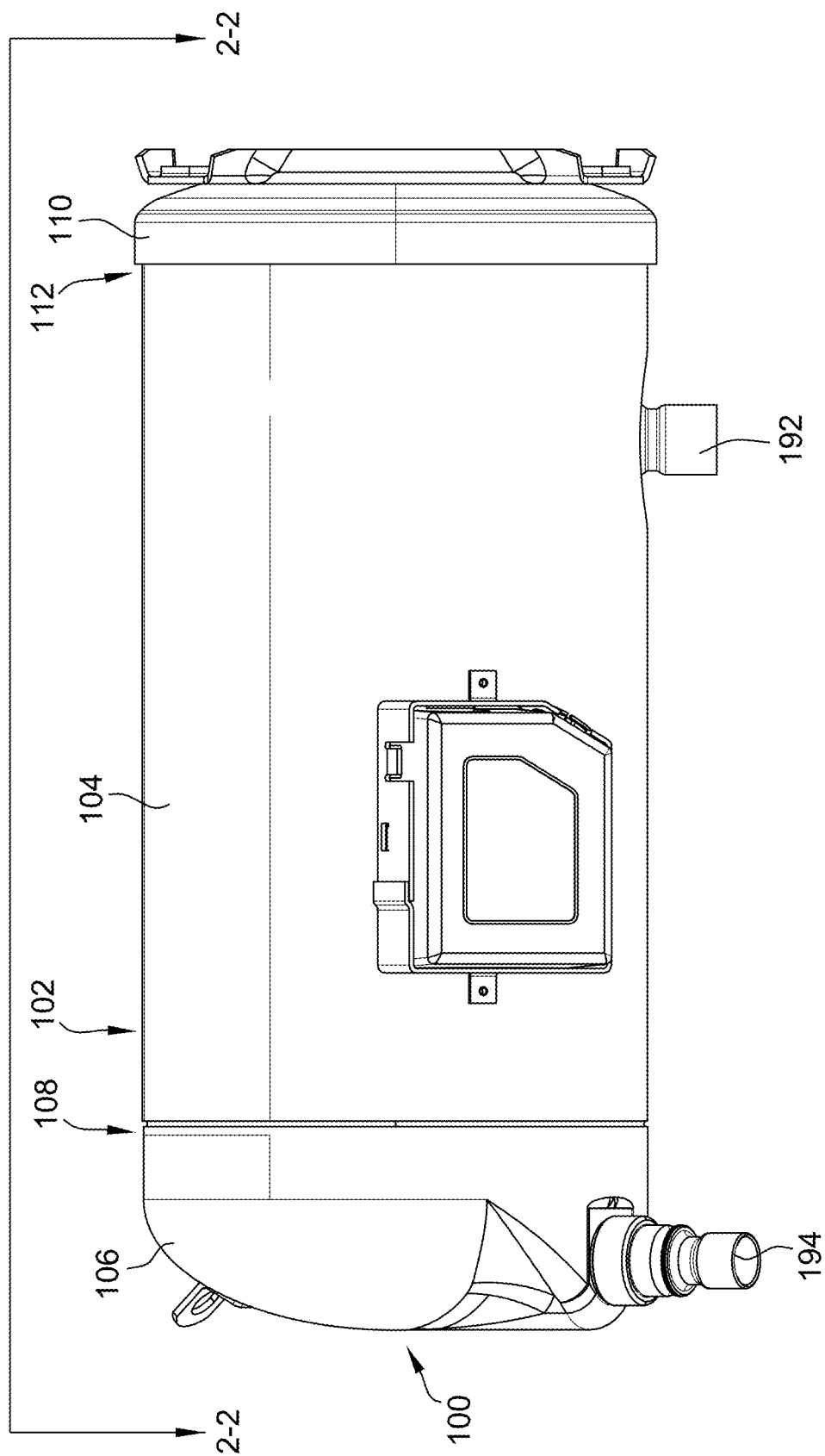
FIG. 1 is a side view of an embodiment of a scroll compressor.

Referring to FIG. 1, a compressor, in this example a scroll compressor, is indicated generally at 100. The compressor 100 includes a compressor housing 102 forming at least one sealed cavity within which refrigerant compression is accomplished. The compressor housing 102 includes a shell 104, an end cap 106 disposed at a first end 108 of the shell 104, and a base 110 disposed at an opposing second end 112 of the shell 104.

Figure 2:
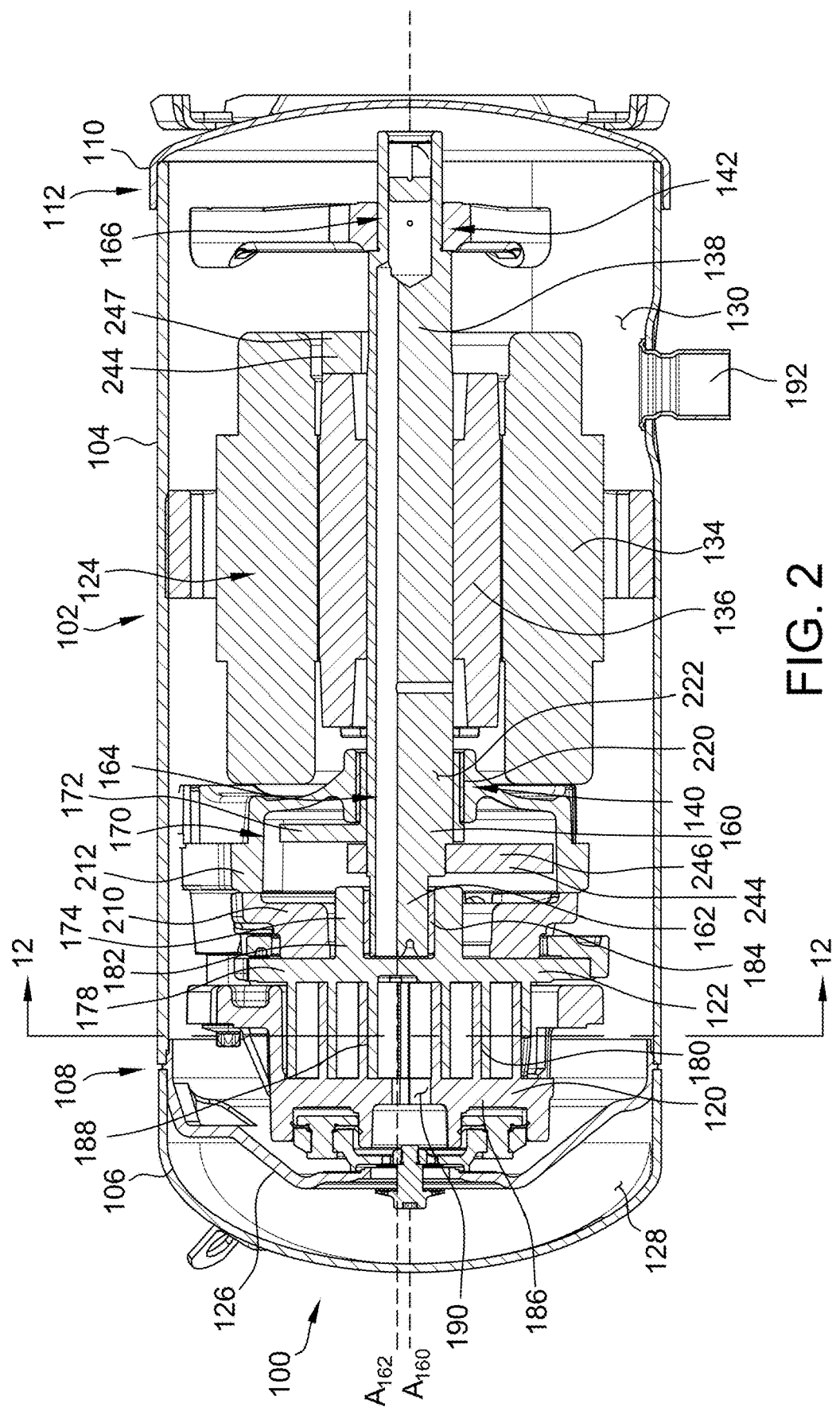
FIG. 2 is a cross-sectional view of the compressor shown in FIG. 1 taken along line 2-2.

Referring now to FIG. 2, the compressor 100 includes a non-orbiting scroll 120 and an orbiting scroll 122 operably engaged with a motor assembly 124. The end cap 106 and a muffler plate 126 at least partially define a first chamber 128. In some embodiments, at least a portion of the non-orbiting scroll 120 and/or at least a portion of the shell 104 at least partially defines the first chamber 128. The shell 104 at least partially defines a second chamber 130. The motor assembly 124 includes a motor stator 134 and a rotor 136. The compressor 100 also includes a driveshaft 138 that may be press fit within the rotor 136. The rotor 136 transmits rotational power to the driveshaft 138. The motor assembly 124 may be a variable-speed motor for rotating the driveshaft 138 at any of a plurality of speeds. In the illustrated embodiment, the motor assembly 124 is disposed within the shell 104, e.g., within the second chamber 130. In some other embodiments, the compressor 100 may be an open drive compressor driven by a motor assembly that is disposed outside of the compressor housing 102. The compressor 100 further includes a first bearing assembly 140 and a second bearing assembly 142 that may rotationally support the driveshaft 138.

The driveshaft 138 includes a driveshaft body 160 and an eccentric body 162 that may be offset from the driveshaft body 160. The driveshaft body 160 and the eccentric body 162 are both generally cylindrical in shape. The driveshaft body 160 includes a longitudinal axis $A_{160}$ extending between a first end portion 164 and a second end portion 166 axially spaced from the first end portion 164. The first end portion 164 may be rotatably supported by the first bearing assembly 140 and the second end portion 166 may be rotatably supported by the second bearing assembly 142. The eccentric body 162 extends axially from the first end portion 164 along an eccentric body longitudinal axis $A_{162}$ that is off set from the longitudinal axis $A_{160}$. The longitudinal axes $A_{160}$ and $A_{162}$ are generally parallel to each other and aligned with an axial direction.

The compressor 100 includes a driveshaft assembly 170 including the driveshaft 138, at least one of the first or second bearing assemblies 140, 142, and an unloader assembly 172. At least a portion of the unloader assembly 172 surrounds the driveshaft 138, e.g., driveshaft body 160. The unloader assembly 172 is rotationally engaged with the driveshaft body 160 such that the driveshaft body 160 imparts a driving force on the unloader assembly 172. The unloader assembly 172 may be rotationally supported by the first bearing assembly 140, e.g., the unloader assembly 172 is disposed radially between the driveshaft body 160 and the first bearing assembly 140. See FIGS. 1-12, for example. Alternatively, the unloader assembly 172 may be rotationally supported by a drive bearing 184, e.g., the unloader assembly 172 may be disposed radially between the driveshaft 138 and the drive bearing 184. See FIGS. 13-16. Alternatively, the unloader assembly 172 may be rotationally supported by the second bearing assembly 142, e.g., the unloader assembly 172 is disposed between the driveshaft 138 and the second bearing assembly 142.

The orbiting scroll 122 includes a plate 178 and a spiral wrap flank surface 180 extending therefrom and a cylindrical hub 182 extending from an opposing side of the plate 178. The cylindrical hub 182 defines an opening that is sized and shaped to receive the drive bearing 184 therein. The eccentric body 162 of the driveshaft 138 is drivingly engaged to the drive bearing 184. The drive bearing 184 transmits rotational motion from the eccentric body 162 to the orbiting scroll 122.

The non-orbiting scroll 120 includes a plate 186 and a spiral wrap flank surface 188 extending axially from the plate 186, e.g., axially towards the base 110. The spiral wrap flank surface 188 meshes with or engages with the spiral wrap flank surface 180 of the orbiting scroll 122 thereby creating a series of moving fluid pockets. The fluid pockets defined by the spiral wrap flank surfaces 180, 188, may decrease in volume as they move from a radially outer position (e.g., at a suction pressure) to a radially inner position (e.g., at a discharge pressure that is higher than the suction pressure) throughout a compression cycle. The plate 186 may include a discharge passage 190, that is in communication with at least one of the fluid pockets at the radially inner position and allows compressed working fluid, such as refrigerant or a mixture of refrigerant and lubricant, (at or near the discharge pressure) to flow therethrough and into the first chamber 128. In some embodiments, the discharge passage 190 is aligned with an aperture defined in the muffler plate 126 and discharged compressed working fluid passes through both the discharge passage 190 and the aperture defined in the muffler plate 126 and into the first chamber 128.

As will be described in detail, in the embodiments described herein, the flank surfaces 180 and 188 are in contact in a first speed range, having a scroll interference contact force, and in a second speed range, the flank surfaces 180, 188 are separated by at least a separation distance d. The driveshaft assembly 170, including the unloader assembly 172, has a variable compliance (e.g., compliant, or constrained) that is dependent on the rotational speed of the driveshaft 138. In the first speed range, the unloader assembly 172 and the driveshaft body 160 are arranged in a compliant arrangement (e.g., compliant relative placement or position) allowing relative motion between the driveshaft 138 and the unloader assembly 172, for example, the unloader assembly 172 may move relative to the driveshaft 138 in a radial direction and/or a tangential direction relative to the axial direction. In the first speed range, when in the compliant arrangement, there is a scroll contact force between the flank surfaces 180, 188. In a second speed range, greater than the first speed range, the unloader assembly 172 and driveshaft 138 may be arranged in a more constrained arrangement (e.g., constrained relative placement or position) restricting relative motion between the driveshaft 138 and the unloader assembly 172. In the second speed range, when in the constrained arrangement, there is no scroll contact force between the flank surfaces 180, 188 because the flank surfaces 180 and 188 are separated by at least a separation distance d.

In the compliant arrangement, deflections of the driveshaft 138 may be unloaded by motion between the unloader assembly 172 and the driveshaft 138. Furthermore, in the compliant arrangement, contact between the spiral wrap flank surfaces 180, 188 is maintained even if the spiral wrap flank surfaces 180, 188 have surface imperfections, minimizing fluid pocket leaks that occur when the driveshaft 138 is rotating in the first speed range. Furthermore, leaks resulting from misalignment between the spiral wrap flank surfaces 180, 188 is also minimized in the first speed range as the compliant arrangement allows the spiral wrap flank surfaces 180, 188 to realign thereby adjusting the scroll contact force.

In the constrained arrangement, the driveshaft 138 is restricted from moving, at least in one direction, relative to the unloader assembly 172. The constrained arrangement reduces both noise and friction occurring when the driveshaft 138 is rotating in the second speed range. In the second speed range, compressor power losses resulting from fluid leakage may be less than compressor power losses resulting from fluid losses in the first speed range because of the higher range of operation speed. Each of the constrained and compliant arrangements will be described in greater detail herein.

The first speed range may be associated with a low-speed range, e.g., suitably between 900-2,400 rpm, and/or suitably between 1,800-4,500 rpm. The second speed range may be associated with a high-speed range, e.g., suitably between 3,600-7,000 rpm, suitably between 4,500-9,000 rpm, suitably between 7,000-14,000, and/or suitably greater than 5,000 rpm. In some embodiments, the first speed range and the second speed range do not overlap. A transition speed includes a speed at which the speed range transitions from the first speed range to the second speed range. The transition speed may be included in the second speed range. The transition speed may be preselected by an operator. The transition speed may be preselected to suit the operating conditions of the compressor 100. For example, the transition speed may be selected to be a value between 2,000-6,000 rpm. In some cases, the transition speed, for a given compressor, may be a range of speeds, and the actual transition speed is dependent on the compressor operating conditions, e.g., compressor load.

In further reference to FIG. 2, an inlet 192 is attached to the compressor housing 102, e.g., the shell 104, for drawing the working fluid into the second chamber 130 and then into the fluid pockets defined by the spiral wrap flank surface 180 and the spiral wrap flank surface 188, where the working fluid is compressed. After the working fluid is compressed, the compressed working fluid exits the fluid pocket defined by the spiral wrap flank surface 180 and the spiral wrap flank surface 188 through the discharge passage 190 and into the first chamber 128. The compressed working fluid exits the first chamber 128 through a discharge fitting 194. See FIG. 1. The discharge fitting 194 may be attached to the compressor housing 102, e.g., at the end cap 106. A discharge valve assembly, not shown, may be disposed within the discharge fitting 194 and may prevent a reverse flow condition through the discharge fitting 194. A hermetic electrical connection (not shown) may be attached to the compressor housing 102, e.g., attached to the shell 104.

Figure 3:
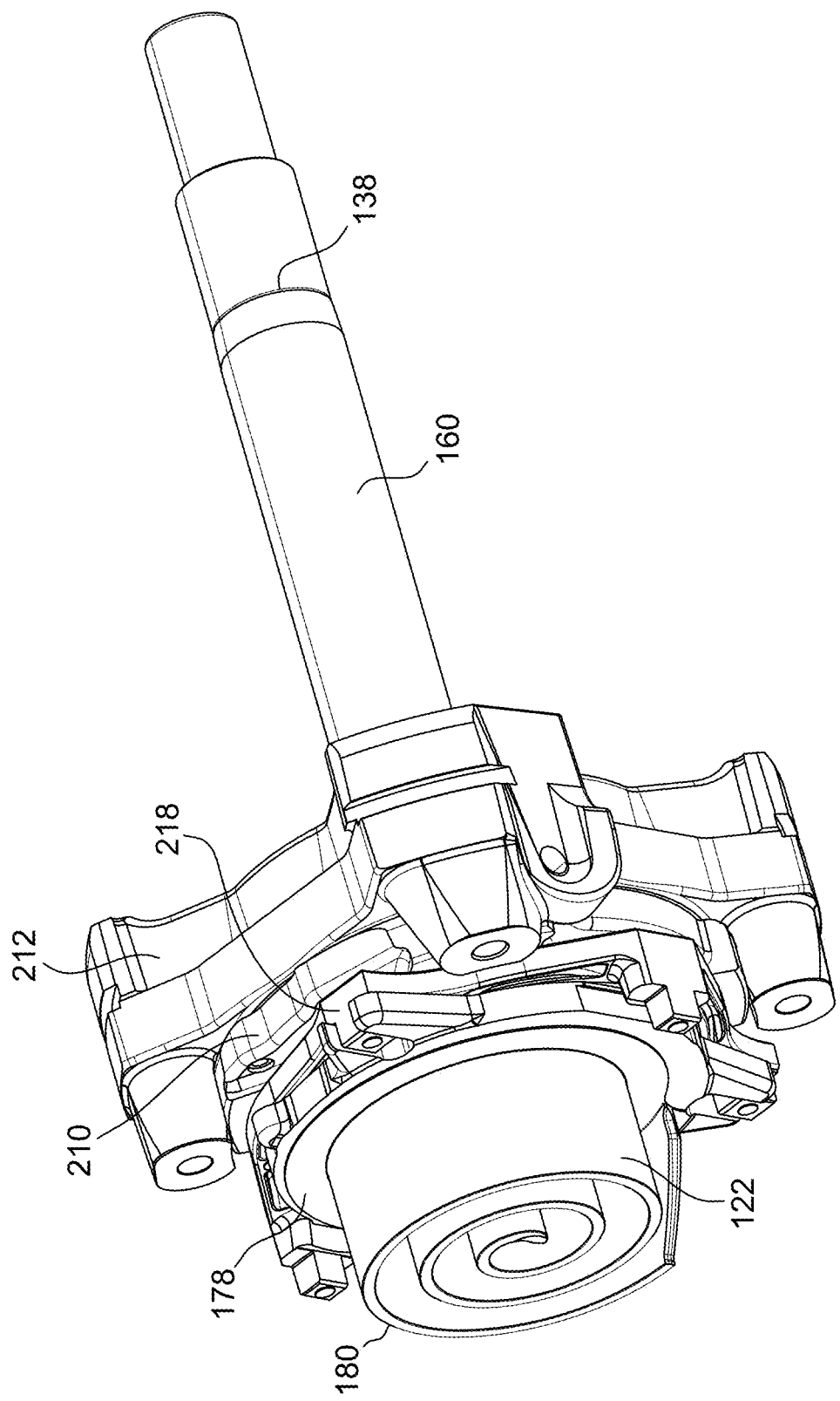
FIG. 3 is a perspective view of a driveshaft assembly and an orbiting scroll removed from the scroll compressor shown in FIG. 1.
Figure 4:
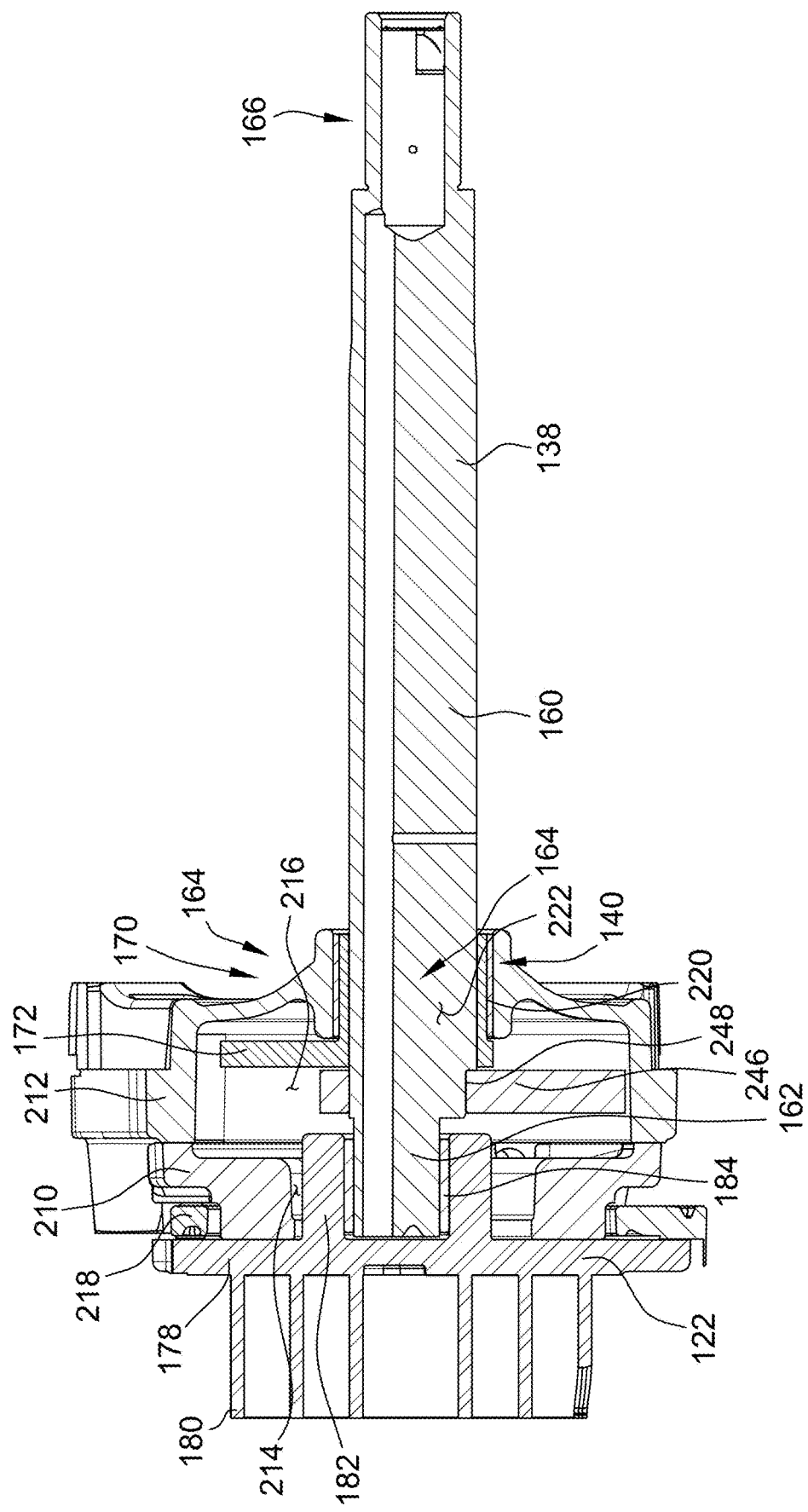
FIG. 4 is a cross-section view of the driveshaft assembly and the orbiting scroll shown in FIG. 3.
Figure 5:
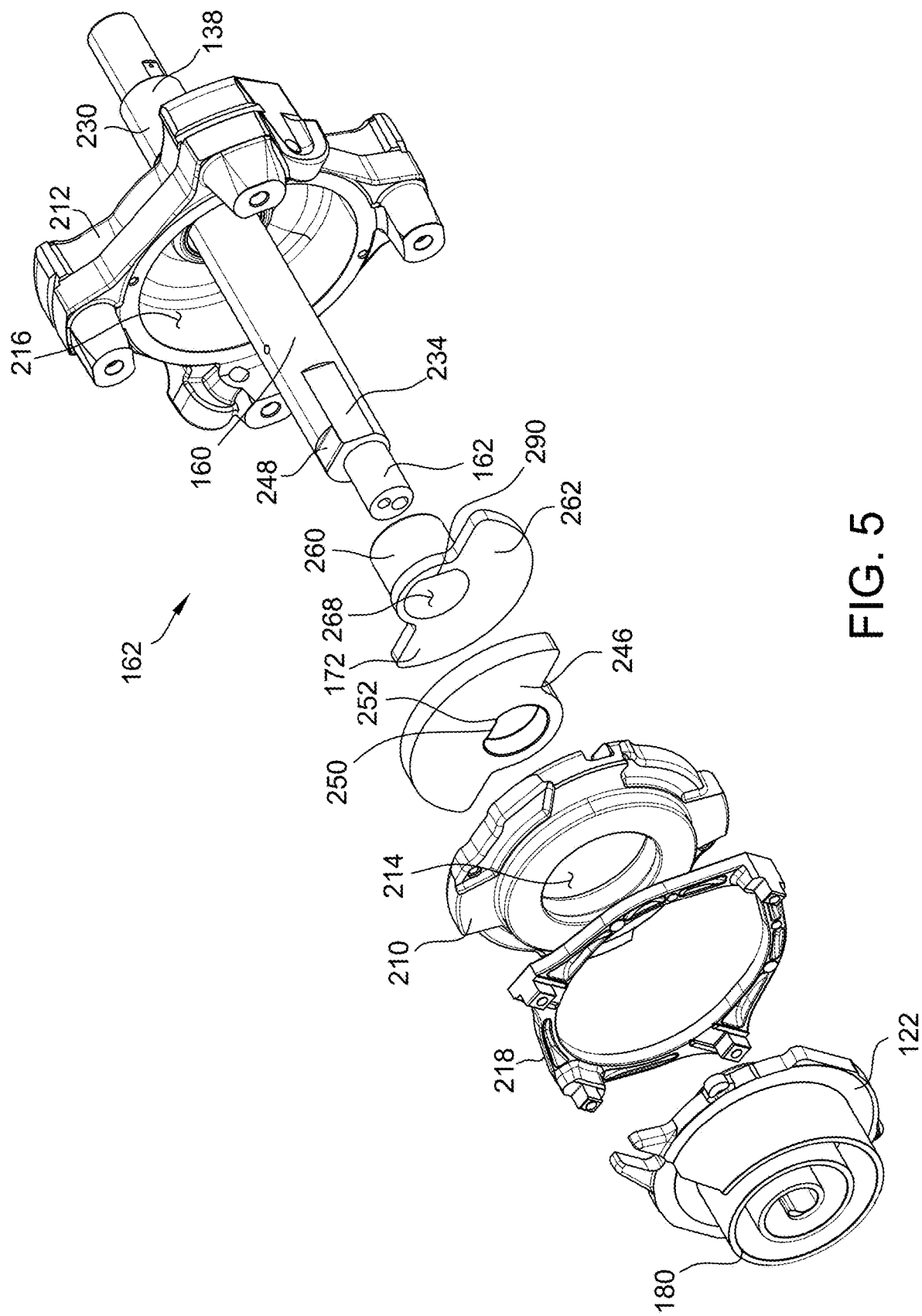
FIG. 5 is an exploded view of the driveshaft assembly and the orbiting scroll shown in FIG. 3.
Figure 6:
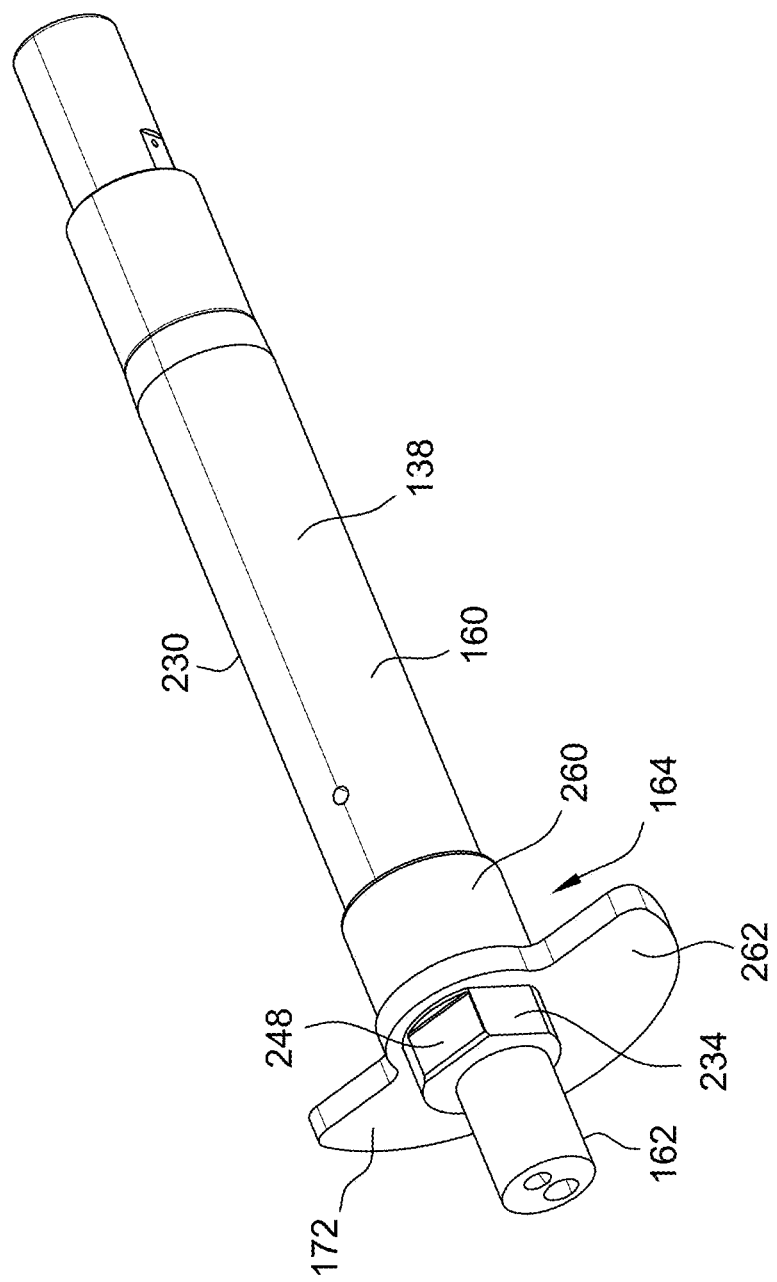
FIG. 6 is a perspective view of the driveshaft and the unloader assembly removed from the compressor shown in FIG. 1.
Figure 7:
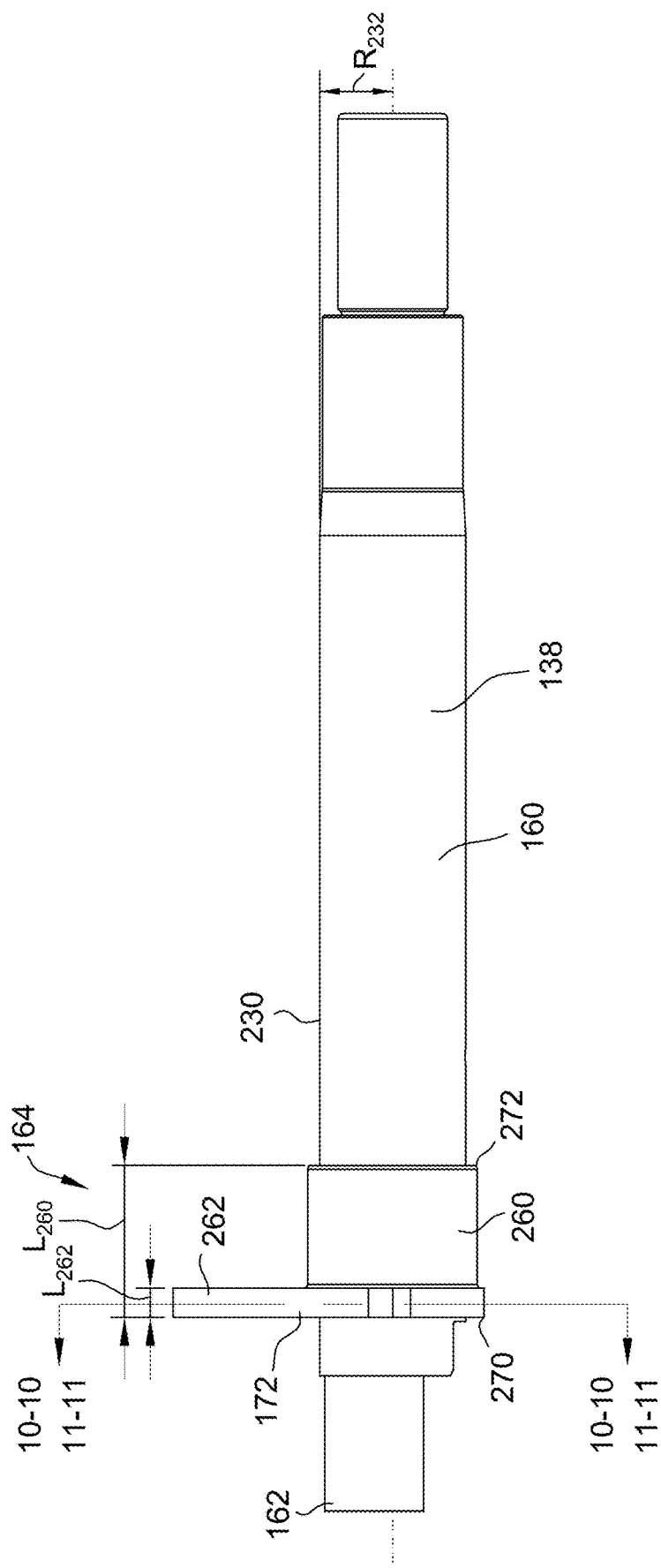
FIG. 7 is a side view of the driveshaft and the unloader assembly shown in FIG. 6.

Referring to FIGS. 3 and 4, the compressor 100 includes a thrust bearing plate 210 and a main bearing housing 212 that may be connected to the shell 104. The thrust bearing plate 210 and the main bearing housing 212 may be connected together, using one or more bolts and/or suitable attachments. Additionally, and/or alternatively, the thrust bearing plate 210 and/or the main bearing housing 212 may be connected to the non-orbiting scroll 120. The thrust bearing plate 210 defines a first cavity 214 that may contain at least a portion of the cylindrical hub 182 of the orbiting scroll 122, at least a portion of the drive bearing 184, and at least a portion of the eccentric body 162 therein. The main bearing housing 212 defines a second cavity 216 that may be sized and shaped to receive at least a portion of the driveshaft body 160, a portion of the unloader assembly 172, and a portion of the first bearing assembly 140 therein. In some embodiments, at least a portion of the thrust bearing plate 210 and/or the main bearing housing 212 may partially define a boundary between the first chamber 128 and the second chamber 130.

A coupling 218, such as an Oldham coupling, is engaged between the orbiting scroll 122 and the non-orbiting scroll 120, preventing relative rotation therebetween. In some embodiments, the coupling 218 is engaged between the orbiting scroll 122 and the main bearing housing 212 and/or the thrust bearing plate 210, preventing relative rotation therebetween.

The first and second bearing assemblies 140, 142 include a bearing surface 220 defining a bearing opening 222. In some embodiments, the first and second bearing assemblies 140, 142 may include rolling element bearings having an inner ring, an outer ring spaced radially outward from the inner ring, and a plurality of rolling elements (e.g., balls and/or rollers) disposed between the inner ring and the outer ring. The inner ring includes an inner surface, e.g., the bearing surface 220, defining the bearing opening 222. Alternatively, in some embodiments, one or more of the first and second bearing assemblies 140, 142 include journal bearings. For example, the main bearing housing 212 includes the bearing surface 220 that defines the bearing opening 222. In the illustrated embodiment, a separate journal bearing is disposed within the second cavity 216 of the main bearing housing 212, and the separate journal bearing may include the bearing surface 220 defining the bearing opening 222. Accordingly, the main bearing housing 212 and first bearing assembly 140 may cooperate to support the driveshaft 138 and/or the unloader assembly 172 for rotational motion relative thereto.

Figure 8:
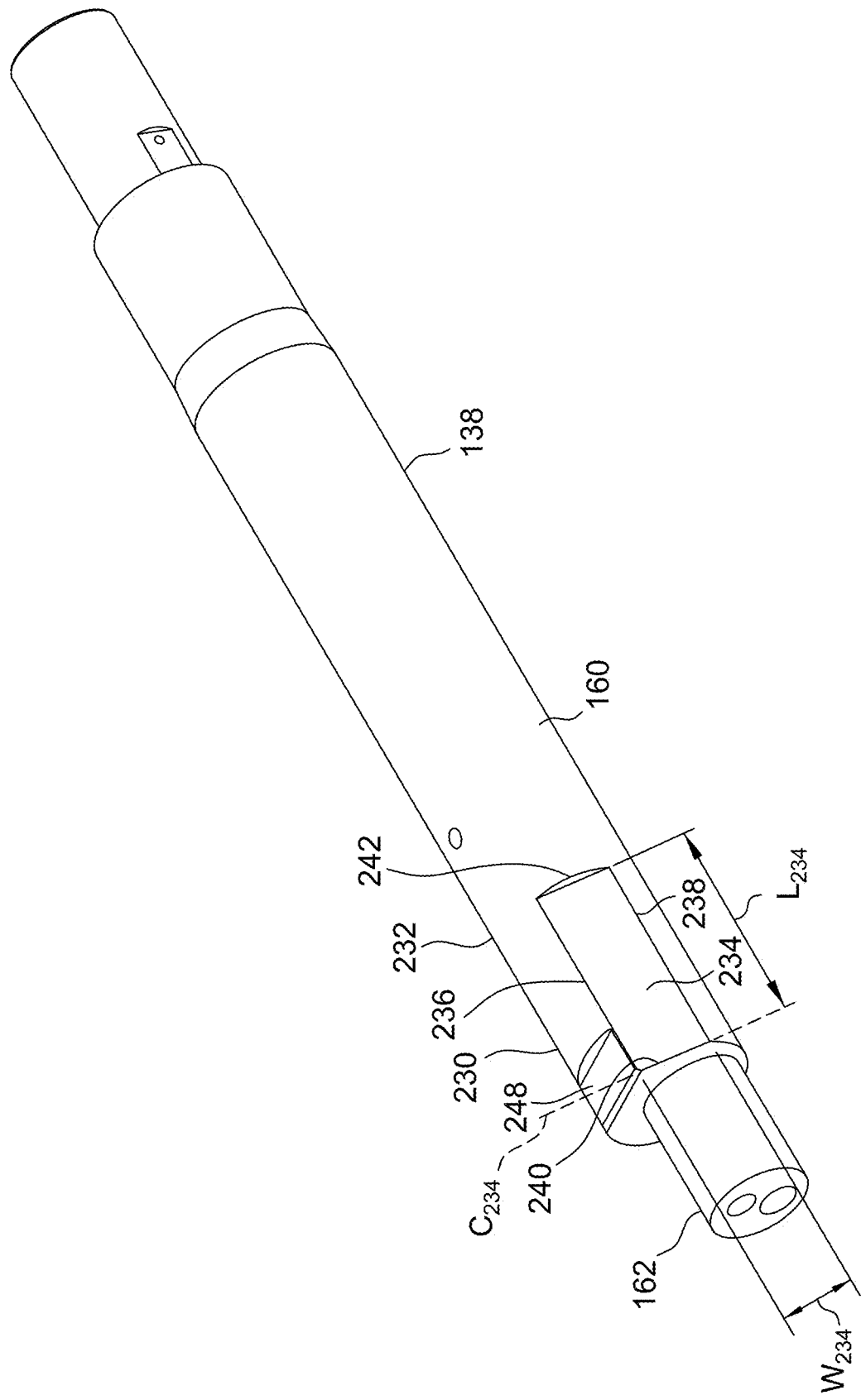
FIG. 8 is a perspective view of the driveshaft removed from the compressor shown in FIG. 1.

Referring to FIG. 8, the driveshaft body 160 has an outer surface 230 including a secondary surface 232, e.g., a cylindrical surface, and a flank surface 234. The flank surface 234 extends along a chord $C_{234}$ of the driveshaft body 160 between a first longitudinal end 236 at a first circumferential position to a second longitudinal end 238 at a second circumferential position. The first and second longitudinal ends 236, 238 extend along the axial direction. The flank surface 234 includes a width $W_{234}$ extending along the chord $C_{234}$ between the first and second longitudinal ends 236, 238. The flank surface 234 also extends for an axial length $L_{234}$ between a first axial end 240 and a second axial end 242. The first and second longitudinal ends 236, 238 and the first and second axial ends 240, 242 define a boundary of the flank surface 234. The flanks surface 234 of the driveshaft body 160 may be substantially planar and the flank surface 234 may be substantially parallel to the longitudinal axis $A_{160}$ of the driveshaft body 160.

The compressor 100 includes one or more secondary counterweights 244 that are rotationally engaged with the driveshaft 138 and are axially offset from the unloader assembly 172. Secondary counterweights 244 may include a main counterweight 246 and a lower counterweight 247 separated by an axial distance. The main counterweight 246 and lower counterweight 247 have different masses, and/or different distribution of mass, e.g., different radial distribution of mass. The secondary counterweights 244 may be rotationally engaged with the driveshaft 138 by one or more secondary flank surfaces 248 on driveshaft 138 that are in contact with secondary flank surface 250 on the secondary counterweights 244. Engagement of the flank surfaces 250 and 248 transmits rotations from the driveshaft 138 to the secondary counterweights 244. The secondary counterweights 244 may also include one or more channels 252 preventing the ends of the driveshaft secondary flank surface 248 from contacting the secondary counterweights 244.

The unloader assembly 172 includes an unloader 260 and a counterweight 262. In some embodiments, the unloader 260 and the counterweight 262 may be integrally formed. Alternatively, the unloader 260 and the counterweight 262 may be connected together using suitable attachments, e.g., welds, screws, bolts, etc. The unloader assembly 172 may be composed of suitable materials, such as steel, and/or steel alloys. The unloader 260 and the counterweight 262 may be composed of the same material. In some embodiments, the unloader 260 and the counterweight 262 may be composed of different materials.

The unloader 260 is generally annular in shape having an outer secondary surface 264 and an inner surface 266 that defines the boundary of an unloader opening 268 extending through the unloader 260. The unloader opening 268 is sized and shaped to receive at least a portion of the driveshaft 138 therein. At least a portion of the unloader 260 may be disposed within the bearing opening 222 of the first bearing assembly 140. The unloader 260 includes an axial length $L_{260}$ that extends between a first axial end 270 and an opposing second axial end 272 axially displaced from the first axial end 270. In the illustrated embodiment, the axial length $L_{260}$ of the unloader 260 is longer than an axial length of the first bearing assembly 140, such that when the unloader 260 is disposed within the bearing opening 222, at least a portion of the unloader 260 extends outside of the bearing opening 222. See FIG. 4. The outer secondary surface 264 includes an outer radius $R_{264}$.

The outer radius $R_{264}$ is suitably the same, or nearly the same, as an inner radius of the bearing surface 220. For example, in embodiments in which the first bearing assembly 140 is a roller bearing, the unloader assembly 172 is rotationally engaged with the inner ring, such that the unloader assembly 172, the driveshaft body 160, and the inner ring rotate together. Alternatively, the outer radius $R_{264}$ of the unloader 260 is slightly less than the inner radius of the bearing surface 220, such that there is a radial clearance between the outer secondary surface 264 of the unloader 260 and the bearing surface 220. For example, in embodiments in which the first bearing assembly 140 is a journal bearing, the unloader assembly 172 rotates, along with the driveshaft 138, relative to the stationary bearing surface 220 of the journal bearing.

Figure 9:
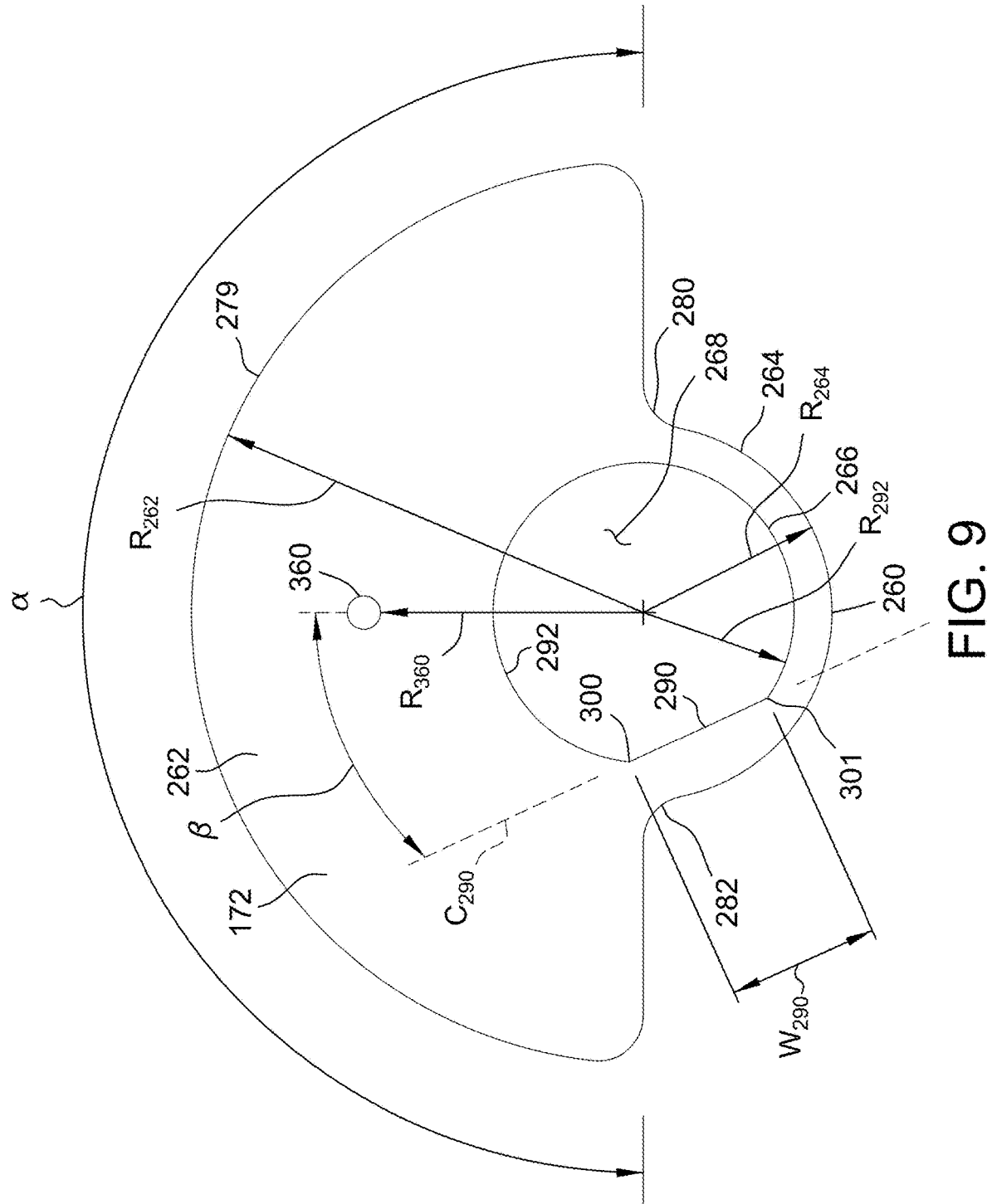
FIG. 9 is a top view of the unloader assembly removed from the compressor shown in FIG. 1.

Referring to FIG. 9, the counterweight 262 extends radially outward from at least one of the first axial end 270 or the second axial end 272 to a radial outer end 279. The counterweight 262 includes an axial thickness $L_{262}$. See FIG. 7. The counterweight 262 includes a radius $R_{262}$. The radius $R_{262}$ of the counterweight 262 is greater than the outer radius $R_{264}$ of the outer secondary surface 264 of the unloader 260. The radius $R_{262}$ of the counterweight 262 may be 1.5-5 times greater than the outer radius $R_{264}$ of the outer secondary surface 264 of the unloader 260. The counterweight 262 extends from the unloader 260 about only a portion of the outer secondary surface 264. For example, the counterweight 262 extends radially outward from the unloader 260 between a first circumferential position 280 and a second circumferential position 282 spanning a counterweight angle α. The counterweight angle α may be less than 180°. The counterweight angle α may be close to 180°, for example, 180°±2°. The counterweight angle α may be between 90° and 180°. The counterweight angle α may be between 180° and 200°. In some embodiments, the counterweight angle α may be greater than 200°.

When the unloader 260 is disposed within the bearing opening 222, the counterweight 262 is disposed outside the bearing opening 222 and within the cavity 216 and/or cavity 214. At least one of cavity 216 and/or cavity 214 is sized and shaped to accommodate the counterweight 262 therein. In particular, the counterweight 262 rotates, with the unloader 260 and the driveshaft 138, within at least one of cavities 216, 214. The counterweight 262 may be any suitable size and/or shape enabling the unloader assembly 172 to function as described herein. For example, the counterweight 262 may be irregular, e.g., having multiple different radii. The radius $R_{262}$ and axial thickness $L_{262}$ (resulting mass of the counterweight 262) are selected to achieve a desired transition speed and to achieve a balanced compressor.

Referring again to FIG. 9, the inner surface 266, defining the unloader opening 268, includes a flank surface 290 and a secondary surface 292, e.g., a cylindrical surface. The secondary surface 292 is defined by an inner radius $R_{292}$. The inner radius $R_{292}$ of the secondary surface 292 of the unloader assembly 172 may be between 0.01-2 mm greater than a radius $R_{232}$ of the secondary surface 232 of the driveshaft body 160. The flank surface 290 includes a width $W_{290}$, extending along a chord $C_{290}$ and an axial length $L_{290}$ (not labeled). The width of the flank surface 290 is at least partially defined by a pair of longitudinal ends 300, 301 extending axially between the first and second axial ends 270, 272. The width $W_{290}$ of the flank surface 290 may be greater than the width $W_{234}$ of the flank surface 234 of the driveshaft 138. For example, the width $W_{290}$ of the flank surface 290 of the unloader 260 may be in the range of 0.1 mm to 2 mm greater than the width $W_{234}$ of the flank surface 234 of the driveshaft body 160. The width $W_{290}$ of the flank surface 290 of the unloader 260 may be in the range of 0.75 mm to 5 mm greater than the width $W_{234}$ of the flank surface 234 of the driveshaft body 160. In some embodiments, the width $W_{290}$ of the flank surface 290 of the unloader 260 may be 5 mm greater than the width $W_{234}$ of the flank surface 234 of the driveshaft body 160. Alternatively, the width $W_{290}$ of the flank surface 290 may be less than the width $W_{234}$ of the flank surface 234 of the driveshaft 138.

The flank surface 290 of the unloader 260 may be substantially planar and the flank surface 290 is substantially parallel to the longitudinal axis $A_{160}$. The axial length $L_{290}$ of the flank surface 290 may be the same as the axial length $L_{260}$ of the unloader 260. Alternatively, the axial length $L_{290}$ of the flank surface 290 may be different than the axial length $L_{260}$ of the unloader 260. For example, the flank surface 290 may extend axially between an upper end and a lower end, the upper and lower ends formed axially inward from the first and second axial ends 270, 272 of the unloader 260. The axial length $L_{260}$ of the flank surface 290 of the unloader 260 may be less and/or equal to the axial length $L_{234}$ of the flank surface 234 of the driveshaft 138.

When the driveshaft body 160 is disposed within the unloader opening 268, the inner surface 266 of the unloader 260 surrounds the outer surface 230 of the driveshaft body 160. In particular, the flank surface 290 is arranged in proximity, and/or in contact with the flank surface 234 and the secondary surface 292 is arranged in proximity to the secondary surface 232. The flank surface 290 may be generally parallel to the flank surface 234. The unloader assembly 174 is rotationally engaged with the driveshaft 138, such that the flank surface 234 contacts the flank surface 290 imparting a driving force on the unloader assembly 174. The driving force may be directed generally perpendicular (e.g., normal) to the flank surface 290. The flank surface 234 of the driveshaft 138 may be in contact with the flank surface 290 of the unloader 260 such that the driveshaft body 160 and the unloader assembly 172 are rotationally engaged, e.g., rotations of the driveshaft body 160 causes rotations of the unloader assembly 172.

Figure 22:
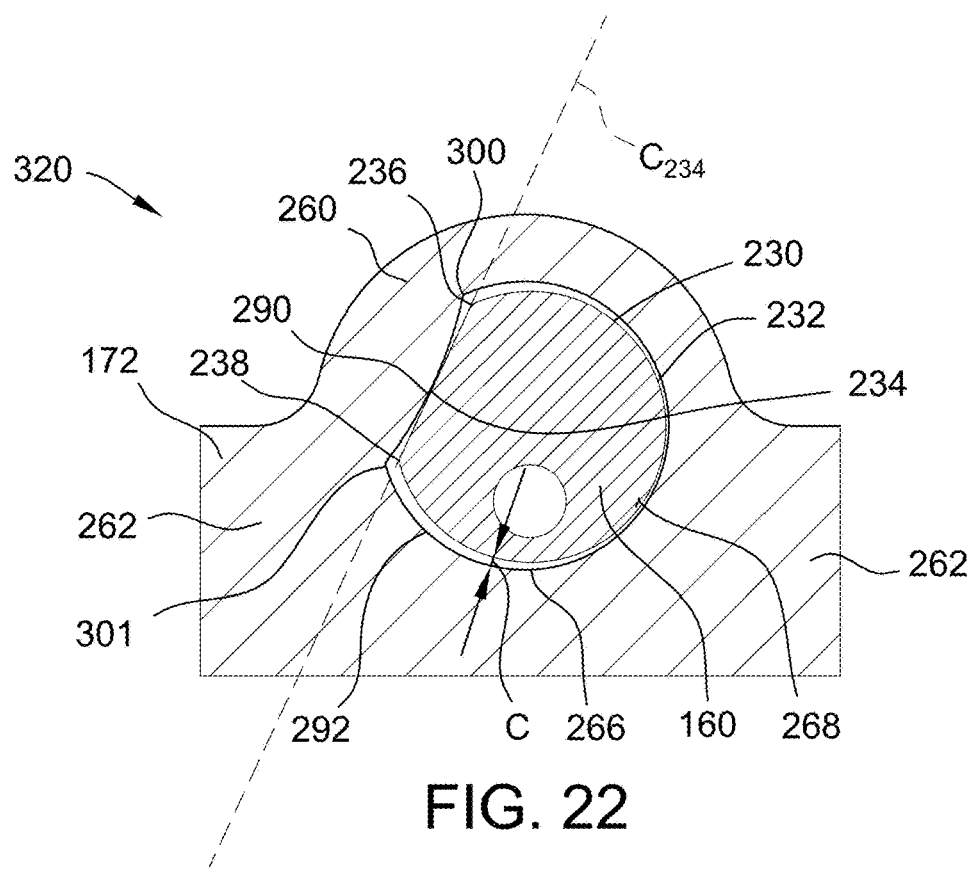
FIG. 22 is another cross-section view of the scroll assembly shown in FIG. 2 taken along line 12-12, showing another example driveshaft and the unloader are in a compliant arrangement.
Figure 23:
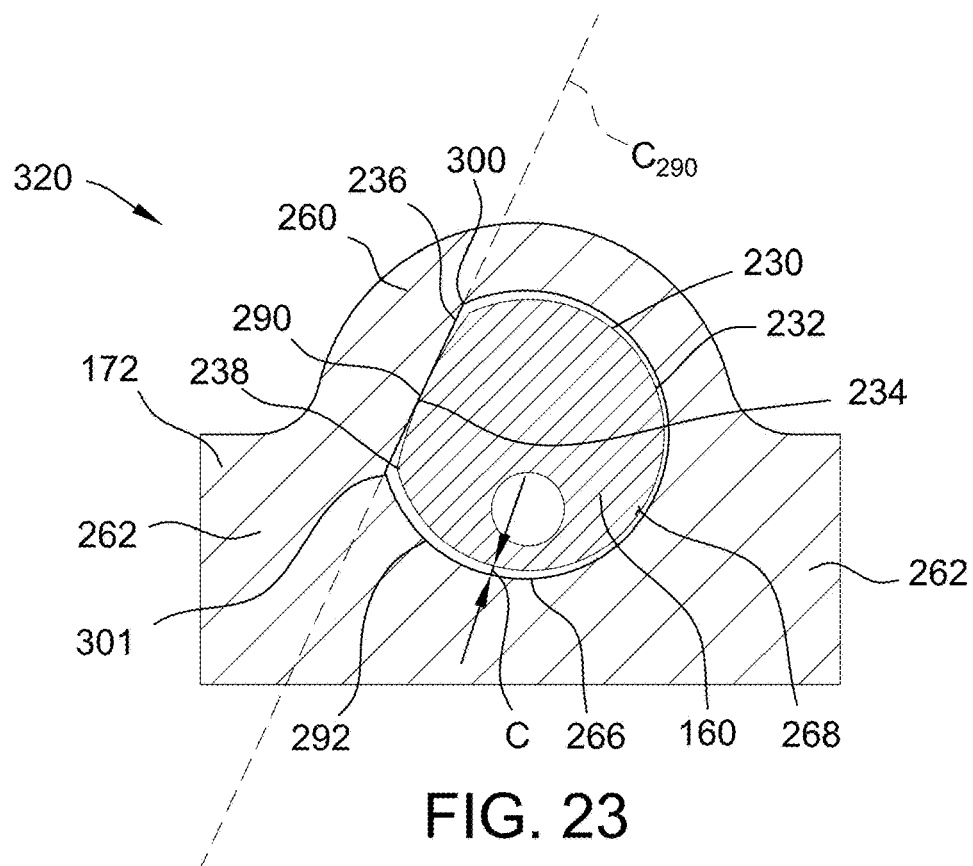
FIG. 23 is another cross-sectional view of the scroll assembly shown in FIG. 2 taken along line 12-12, when the driveshaft and another example unloader are in a compliant arrangement.

In reference to FIGS. 22 and 23, in some cases, the flank surface 234 of the driveshaft body 160 and/or the flank surface 290 of the unloader 260 may not be planar. In some embodiments, at least one of the flank surface 234 and/or the flank surface 290 may be curved. For example, at least one of the flank surface 234 and/or the flank surface 290 may be curved in the axial direction or in the radial direction. In some embodiments, at least one of the flank surface 234 and/or the flank surface 290 may be dome shaped. In some embodiments, the flank surface 290 may be curved and the flank surface 234 may be planar, and the curved flank surface 290 may allow the unloader 260 to rock, e.g., pivot or rotate, relative to the driveshaft 138, about any suitable direction.

The flank surface 290 may be in sliding contact with the flank surface 234 of the driveshaft body 160 allowing the unloader assembly 172 to move relative to the driveshaft body 160 along a direction that is generally perpendicular to the axial direction, e.g., a radial or tangential direction. The sliding direction, between the flank surface 290 and the flank surface 234 may be generally along chord $C_{234}$ and/or chord $C_{290}$. The unloader assembly 172 may be restricted from sliding relative to the driveshaft body 160 along the axial direction. For example, the compressor 100 may include a retention feature that restricts the axial motion of the unloader assembly 172 relative to the driveshaft 138. At least one of the first and second axial ends 240, 242 may include a surface that engages with at least one of the first and second axial ends 270, 272 of the unloader 260. For example, the second axial end 242 may restrict axial translations of the unloader assembly 172.

Figure 10A:
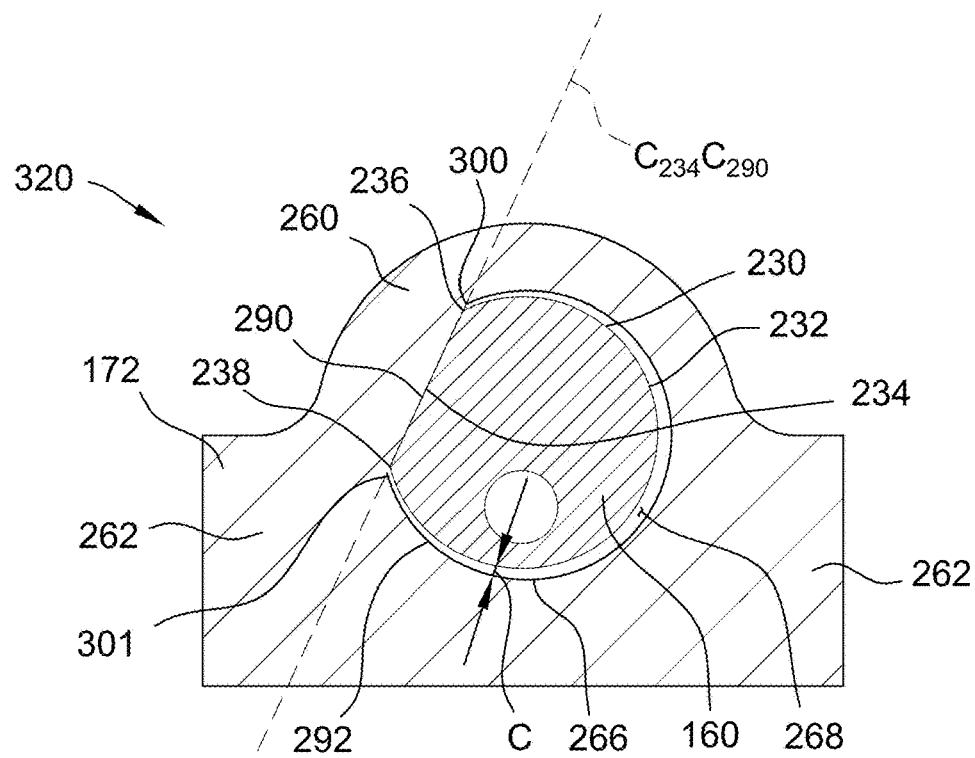
FIG. 10A is a cross-sectional view of the driveshaft and the unloader assembly shown in FIG. 7 taken along line 10-10, the driveshaft and the unloader assembly in a compliant arrangement.
Figure 10B:
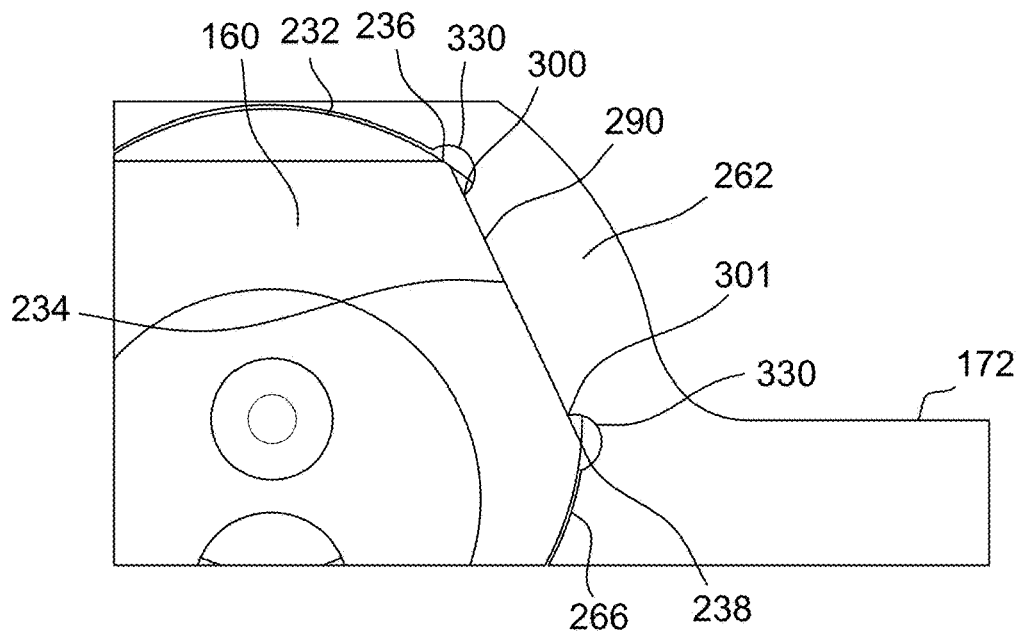
FIG. 10B is a cross-sectional view of another embodiment of a driveshaft and an unloader assembly shown in FIG. 7 taken along line 10-10, a driveshaft and an unloader assembly in a compliant arrangement.
Figure 11:
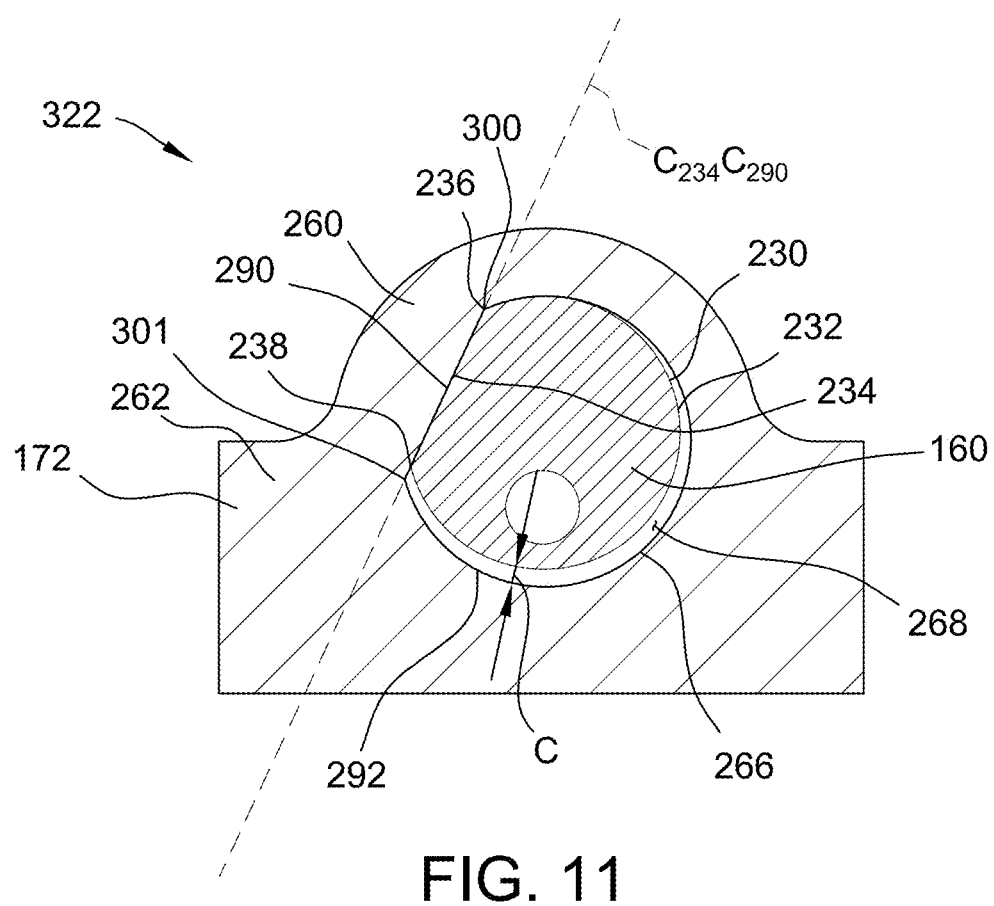
FIG. 11 is a cross-sectional view of the driveshaft and the unloader assembly shown in FIG. 7 taken along line 11-11, the driveshaft and the unloader assembly in a constrained arrangement.

The inner radius $R_{292}$ of the secondary surface 292 of the unloader 260 is greater than the radius $R_{232}$ of the secondary surface 232 of the driveshaft body 160 and accordingly, there may be a clearance C extending radially between the secondary surface 292 of the unloader 260 and the secondary surface 232 of the driveshaft body 160. See FIGS. 10 and 11. The clearance C may be in the range of 0.01-0.99 mm. The clearance C may be in the range of 0.05-5 mm. The relative position of the unloader assembly 172 and the driveshaft body 160 is dependent on the rotational speed of the driveshaft 138 and the unloader assembly 172. In particular, the rotational speed of the unloader assembly 172 may move the unloader assembly 172 relative to the driveshaft 138, generally in a direction perpendicular to the axial direction, thereby changing the relative position of the unloader assembly 172 and the driveshaft body 160. The driveshaft body 160 and the unloader assembly 172 may be arranged in one of a plurality of different relative arrangements and/or positions at different rotational speeds. For example, the driveshaft 138 and the unloader assembly 172 may be arranged in a compliant arrangement 320 during the first speed range, see FIGS. 10A-10B, or a constrained arrangement 322 during the second speed range, see FIG. 11. In FIGS. 10A-10B and 11, the driveshaft body 160 has been reduced in scale for clarity.

Referring to FIG. 10A, the driveshaft 138 and the unloader assembly 172 are arranged in the compliant arrangement 320 during a first speed range where the driveshaft 138 is more centered within the unloader opening 268. In the compliant arrangement 320, the clearance C between the secondary surface 232 of the driveshaft 138 and the secondary surface 292 of the unloader 260 may be generally uniform. In the compliant arrangement 320, the flank surface 290 of the unloader 260 may be generally centered, along the chord $C_{234}$ direction, with the flank surface 234 of the driveshaft 138. In the compliant arrangement 320, the secondary surface 232 of the driveshaft 138 is not in contact with the secondary surface 292 of the unloader 260. Accordingly, in the compliant arrangement, there is sufficient clearance C, such that the flank surface 290 has space to slide against the flank surface 234 of the driveshaft 138, generally in a direction along chord $C_{234}$ in either a first direction or a second direction that is opposite the first direction.

Referring to FIG. 10B, in some embodiments, the inner surface 266 includes one or more channels 330. The channel 330 extends along the axial direction. The unloader assembly 172 may include two of the channel 330 arranged at each of the first and second longitudinal ends 300, 301 of the unloader 260. The channels 330 may be arranged in proximity to the first longitudinal end 236 and the second longitudinal end 238 of the driveshaft 138 when the driveshaft 138 is disposed within the unloader opening 268. The channels 330 prevent the longitudinal ends 236 and 238 of the driveshaft 138 from contacting the inner surface 266, reducing, and/or preventing, stress concentrations between the driveshaft 138 and the unloader assembly 172.

Figure 12A:
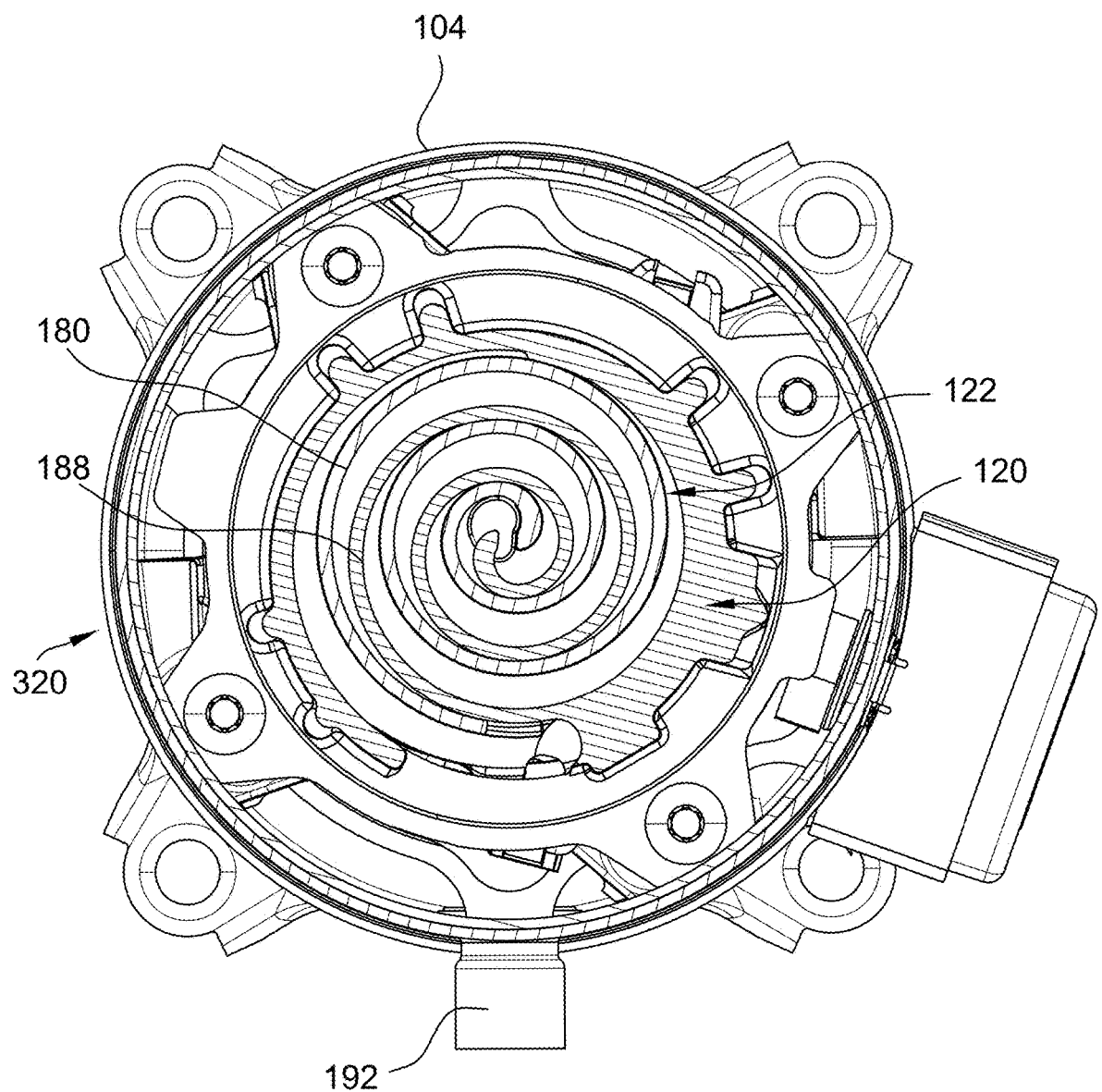
FIG. 12A is a cross-section view of the scroll assembly shown in FIG. 2 taken along line 12-12, when the driveshaft and the unloader are in a compliant arrangement.

Referring to FIG. 12A, in the first speed range, the non-orbiting spiral wrap flank surface 188 and orbiting spiral wrap flank surface 180 are in contact and the scroll interference contact force is non-zero. The magnitude of the scroll interference forces, in the first speed range, between the non-orbiting spiral wrap flank surface 188 and orbiting spiral wrap flank surface 180 may be targeted by a balance of inertial forces from the secondary counterweights 244, and the counterweight 262, inertial force of the orbiting scroll 122, and/or unloader interference forces, generally in the radial direction, between the flank surface 290 and the flank surface 234. The achieved scroll interference contact forces, in the first speed range, may be targeted by the relative position between the unloader assembly 172 and the driveshaft 138

In reference to FIG. 11, as the driveshaft 138 speed increases, the flank surface 290 of the unloader 260 slides against the flank surface 234 of the driveshaft 138 until at least one of the first longitudinal end 236 or the second longitudinal end 238 contacts an adjacent one of first or second longitudinal ends 300, 301 of the unloader 260, arresting further translations of the flanks surfaces 290, 234 against each other. Additionally, and/or alternatively, as the driveshaft 138 speed increases, the flank surface 290 of the unloader 260 slides against the flank surface 234 of the driveshaft 138 until the secondary surface 292 of the unloader 260 comes into contact with the secondary surface 232 of the driveshaft 138, arresting further sliding between the flanks surfaces 290, 234 against each other. When the motion of the unloader assembly 172 is restricted a targeted separation distance d between the spiral wrap flank surfaces 188 and 180 is achieved. In some embodiments, the target separation distance d may be between 0.05 to 0.1 mm.

Figure 12B:
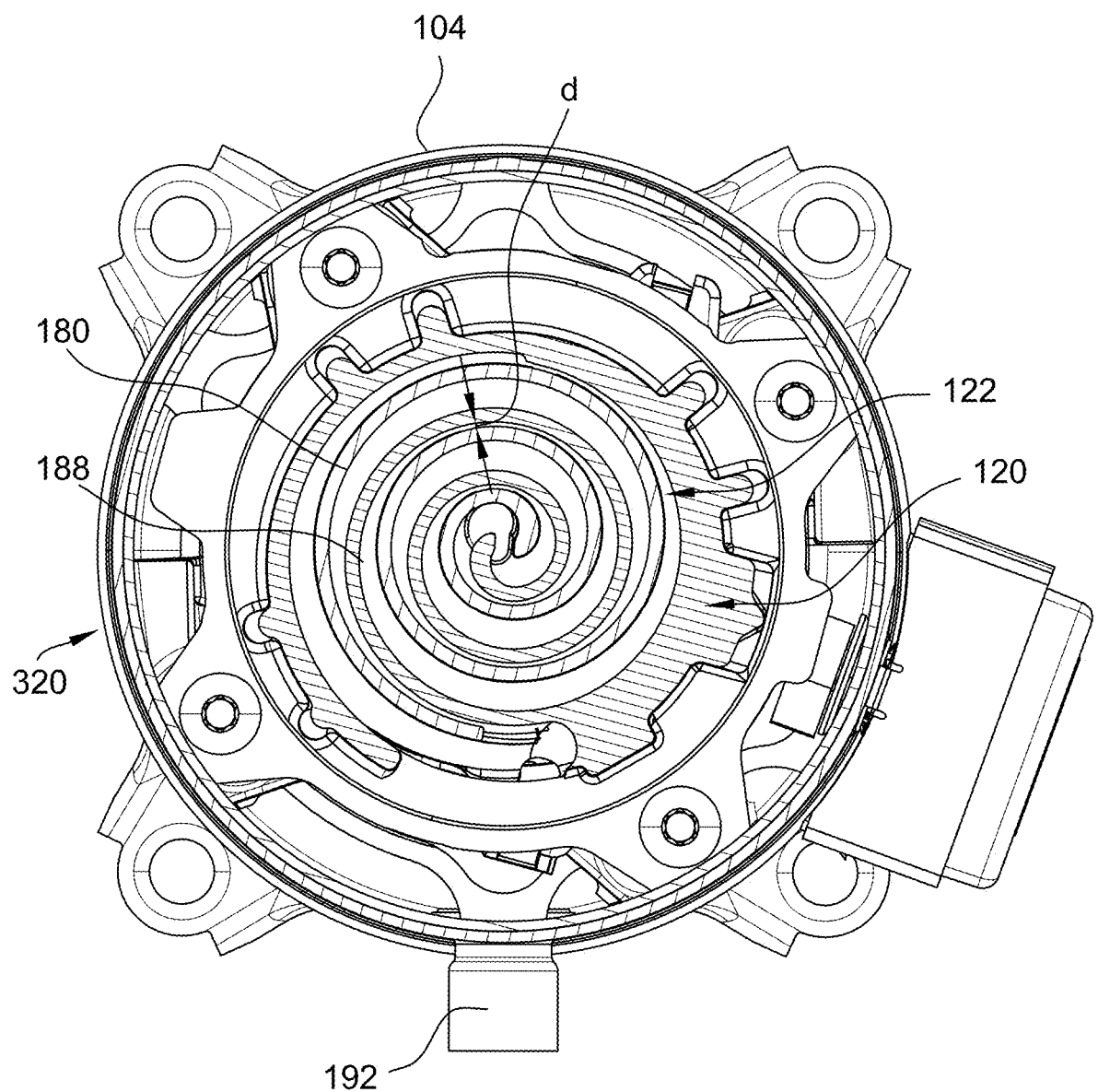
FIG. 12B is a cross-sectional view of the scroll assembly shown in FIG. 2 taken along line 12-12, when the driveshaft and the unloader are in a constrained arrangement.
Figure 13:
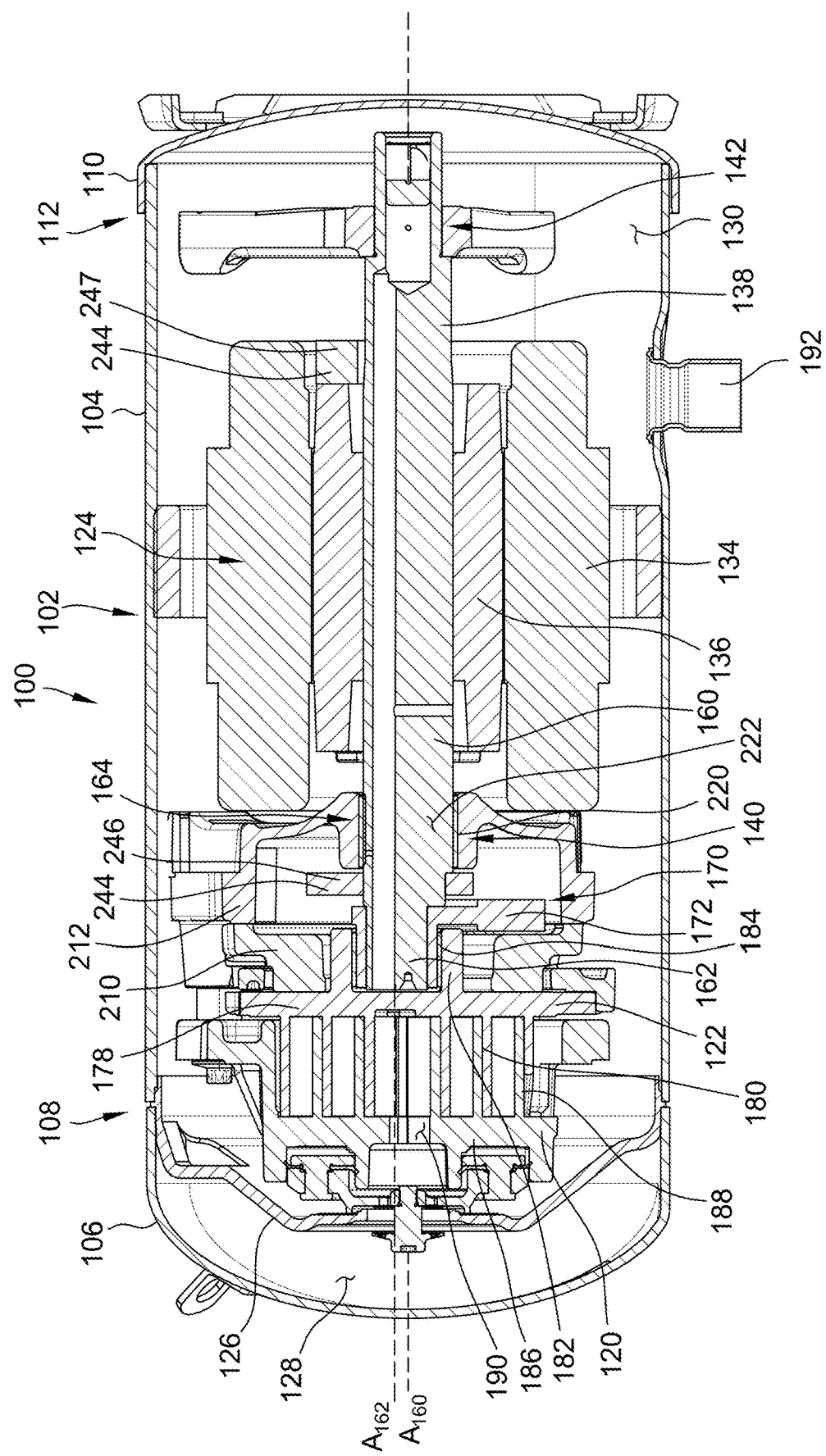
FIG. 13 is a cross-sectional view of an alternative embodiment of a scroll compressor.
Figure 14:
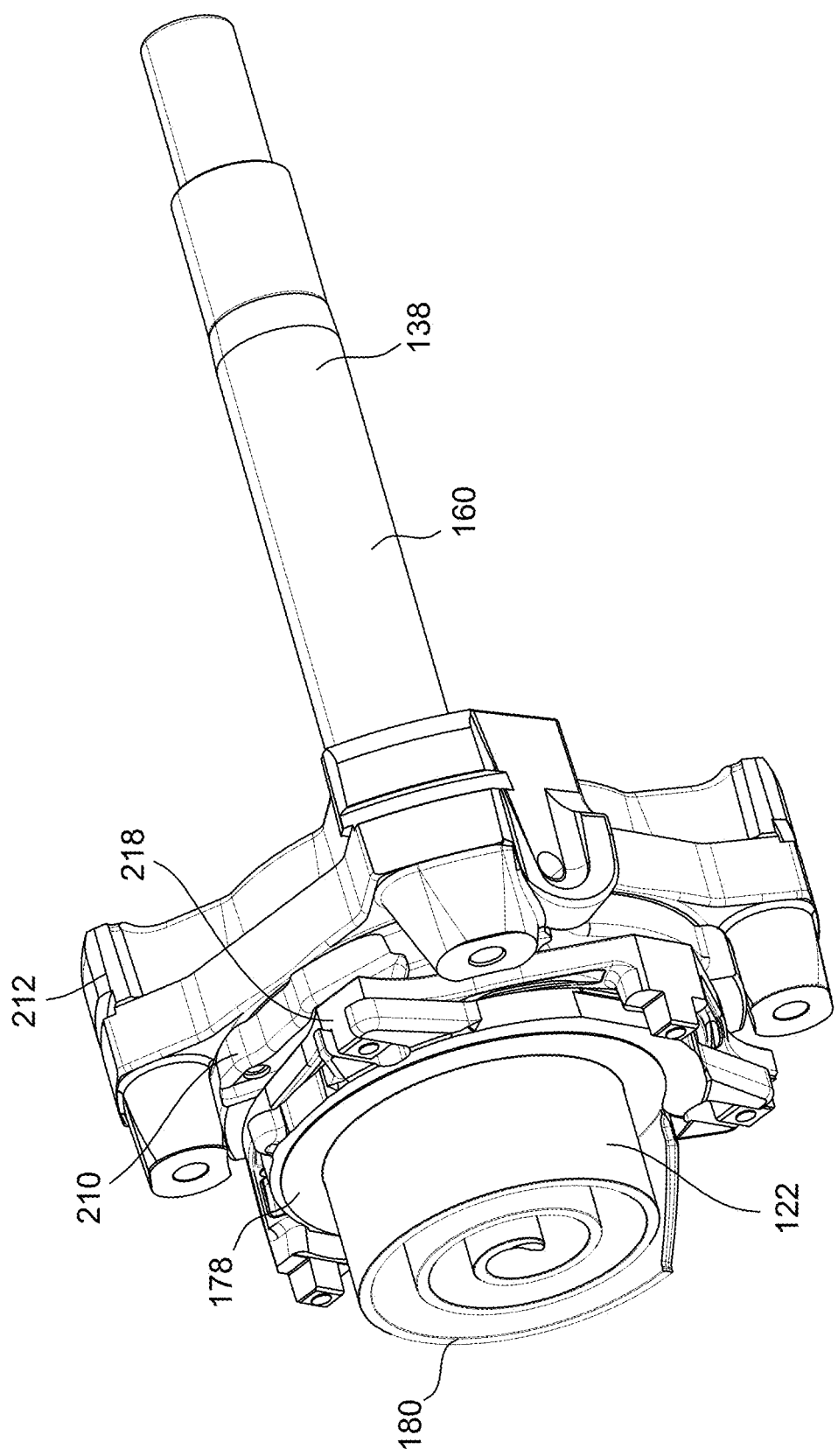
FIG. 14 is a perspective view of the driveshaft assembly and the orbiting scroll removed from the scroll compressor shown in FIG. 13.
Figure 15:
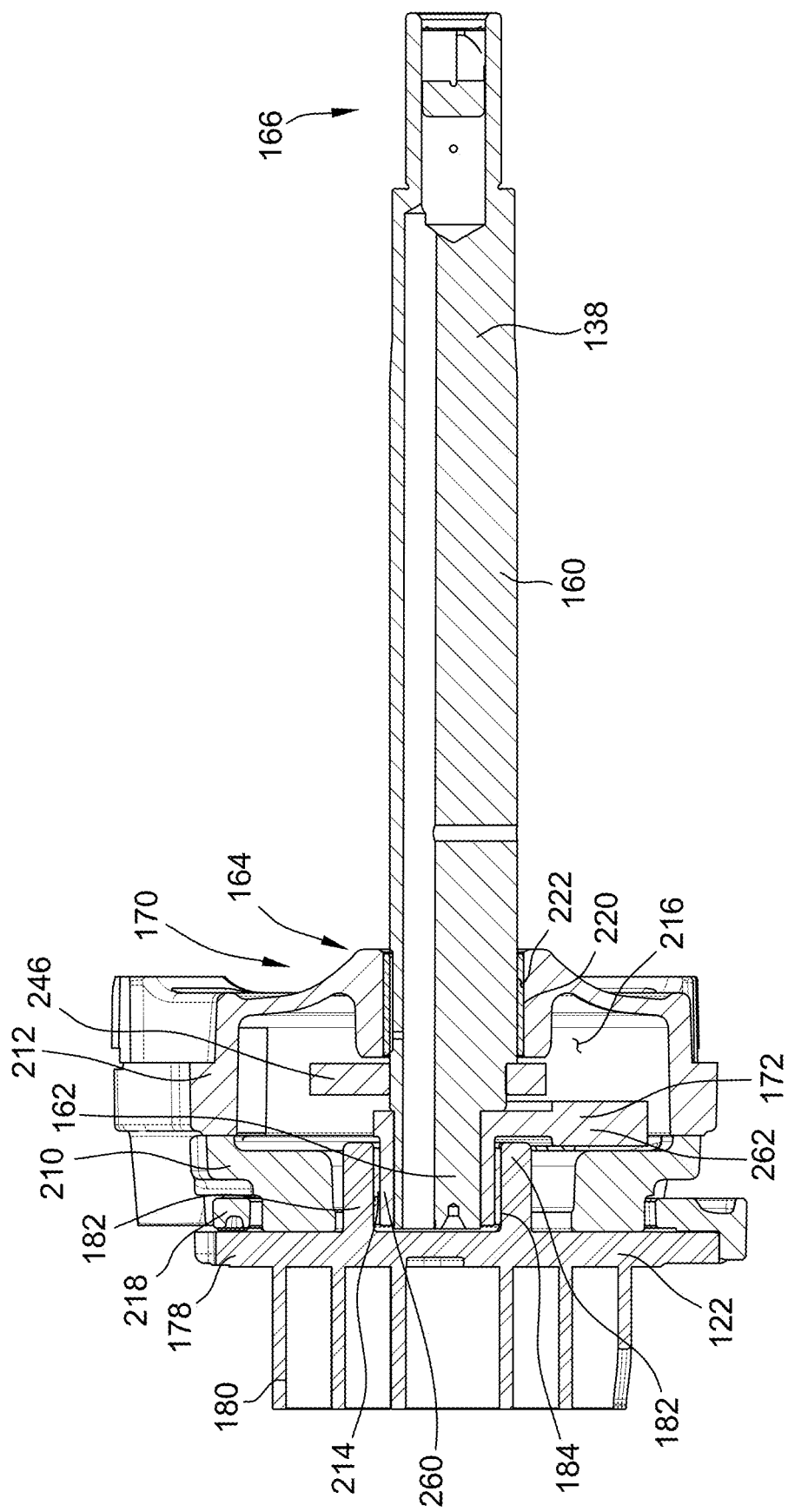
FIG. 15 is a detailed cross-section view of the driveshaft assembly and the orbiting scroll shown in FIG. 13.
Figure 16:
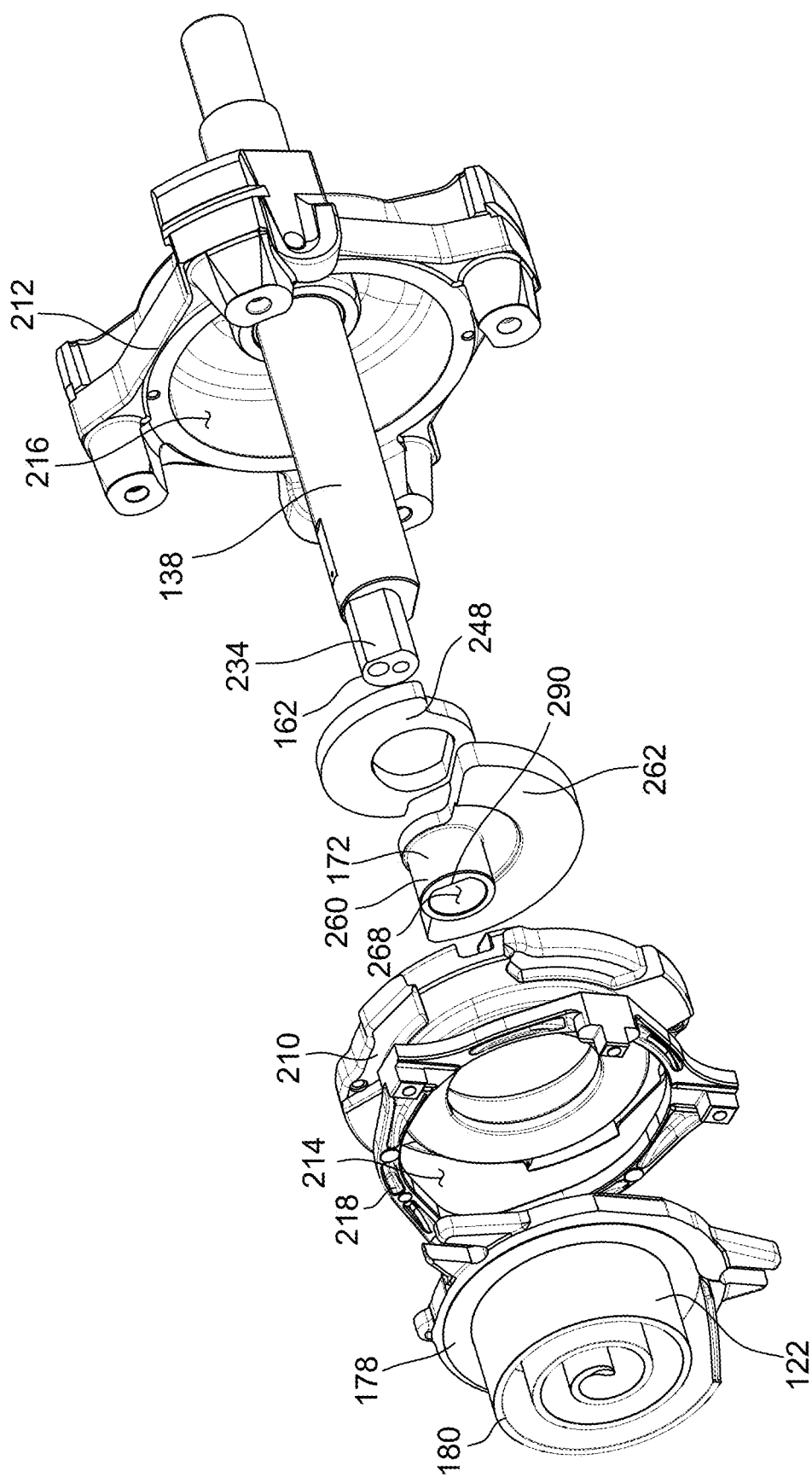
FIG. 16 is an exploded view of the driveshaft assembly and the orbiting scroll shown in FIG. 13.

In reference to FIG. 12B, in the second speed range, the non-orbiting spiral wrap flank surface 188 and orbiting spiral wrap flank surface 180 are not in contact and the scroll interference force is zero. In the second speed range, the non-orbiting spiral wrap flank surface 188 and orbiting spiral wrap flank surface 180 are spaced apart by at least the scroll separation distance d. In FIG. 12B, the separation distance d may be increased in scale, for clarity. The speed at which motion of the unloader assembly 172 is arrested relative to the driveshaft 138 is the transition speed. In the second speed range, centrifugal forces of the counterweight 262 may exceed a radial component of the drive force between the flank surfaces 290 and 234 and a centrifugal force of the orbiting scroll 122 and the separation distance between the scroll flank surface 180, 188 achieved. The separation distance may be pre-determined by selected clearances between components.

The relative dimensions of the flank surfaces 290, 234, and the clearance C may be adjusted in order to target a specific transition speed. For example, in embodiments in which the width $W_{234}$ of the flank surface 234 is closer to the width $W_{290}$ of the flank surface 290, the transition speed may be lower as compared to embodiments in which the width $W_{290}$ of the flank surface 290 of the unloader 260 is much greater than the width $W_{234}$ of the flank surface 234 of the driveshaft 138. At driveshaft 138 rotational speeds at the transition speed, or higher, the driveshaft 138 and the unloader assembly 172 may be arranged in a constrained arrangement 322, preventing further motion, e.g., preventing further translations between the flank surface 234 and the flank surface 290.

While in the constrained arrangement 322, the flank surface 234 is unconstrained, in a direction opposite the first direction, or in a direction generally opposite to the contact location between the secondary surface 292 of the unloader assembly 172 and the secondary surface 232 of the driveshaft 138. This allows the unloader assembly 174 to move from the constrained arrangement 322 to the compliant arrangement 320, when the driveshaft speed is reduced to the first speed range.

In embodiments including channels 330, the channels 330 prevent contact between the longitudinal ends 236 and 238 and the inner surface 266, when the driveshaft 138 and the unloader assembly 172 are arranged in a constrained arrangement, not shown. For example, as the driveshaft 138 speed increases, the flank surface 290 of the unloader 260 slides against the flank surface 234 of the driveshaft 138 until the secondary surface 232 contacts the secondary surface 292 of the unloader 260, arresting further translations of the flanks surfaces 290, 234 against each other.

The counterweight 262 includes a counterweight center 360, e.g., a counterweight center of mass and/or a geometric center, and a radius $R_{360}$ extending to the center 360. The flank surface 290, extending along the chord $C_{290}$, is arranged at flank angle β relative radius $R_{360}$. See FIG. 9. The flank angle β may be in the range of 5° and 55°. The flank angle β may be approximately 25°, e.g., 25°±2°.

In the second speed range, the distribution of mass of the unloader assembly 172, e.g., the counterweight 262 extending radially outwards from the unloader 260, combined with the rotational speed of the driveshaft 138 and the unloader assembly 172 may result in a centrifugal force that maintains the constrained arrangement 322 in which the secondary surface 292 of the unloader assembly 172 is pressed against the secondary surface 232 of the driveshaft 138. In particular, the center 360 of the counterweight 262 is off set from the center of mass of the unloader 260, the center of mass of the unloader 260 is generally arranged along the axis of rotation. Accordingly, the center of mass of the unloader assembly 172, including both the unloader 260 and the counterweight 262, may not be aligned with the axis of rotation. The shape and dimensions of the counterweight 262, e.g., axial thickness $L_{262}$, counterweight radius $R_{262}$, and/or the counterweight angle α may be adjusted to achieve the desired moment of inertia of the counterweight 262 and/or the center of mass of the counterweight 262.

Compressor balance is achieved by appropriate pairing and selection of the unloader assembly 172 and the secondary counterweights 244. In particular, selected sizes, shapes, masses, radial mass distributions, and/or axial/radial placements of each of the unloader assembly 172 and the secondary counterweights 244, e.g., the main counterweight 246 and/or the lower counterweight 247, is selected such that inertial forces created by the unloader assembly 172, the secondary counterweights 244, and the orbiting scroll 122 balance each other out.

In the first speed range, the unloader assembly 172 is arranged in the compliant arrangement 320, allowing motion between the driveshaft body 160 and the unloader assembly 172, and the counterweight 262 includes an inertial force which may cause a change in the relative position between the unloader assembly 172 and the driveshaft 138. See FIGS. 10A and 10B. In the first speed range, there may not be a separation distance between the scroll flanks surfaces 180, 188 such that there is a flank contact force between the scroll flank surfaces 180, 188. See FIG. 12A. The compliant arrangement 320 adjusts, e.g., reduces, the contact force between scroll flanks surfaces 180, 188. In some cases, the contact force may be preselected based on the selected configuration (e.g., shape, size, configuration, or weight distribution) of the unloader assembly 172. The inertial forces of the unloader assembly 172 cause relative motion between the unloader assembly 172 and the driveshaft 138 at a pre-determined transition speed which repositions the unloader assembly 172 from the compliant arrangement 320 to the constrained arrangement 322, where in the constrained arrangement 322, the scroll flank surfaces 180, 188 are separated by at least the desired separation distance d.

In the second speed range, the separation distance d between the scroll flank surfaces 180, 188 is such that there is no contact force. See FIG. 12B. Further, in the constrained arrangement 322, motion between the driveshaft body 160 and the unloader assembly 172 is restricted. See FIG. 11. The scroll separation distance d, in the second speed range, is preselected based on the selected configuration of the unloader assembly 172 (e.g., shape, size, configuration, or weight distribution of the unloader 260 and the counterweight 262). In some embodiments, the scroll separation distance d, when the unloader assembly 172 is in the constrained arrangement 322 may result from a selected clearance between the unloader assembly 172 and the driveshaft 138 and/or deflections of the driveshaft 138.

The unloader assembly 172 may be rotationally supported by any one of the bearing assemblies, such as the first bearing assembly 140, the second bearing assembly 142, and/or the drive bearing 184. In embodiments shown in FIGS. 1-12, the unloader assembly 172 is rotationally supported by the first bearing assembly 140. FIGS. 13-16 illustrate another embodiment of compressor 100 including the driveshaft assembly 170, similar to the description above. In embodiments depicted in FIGS. 13-16, the driveshaft assembly 170 includes the driveshaft body 160, the drive bearing 184, and the unloader assembly 172 rotationally supported by the drive bearing 184. The counterweight 262 is disposed outside the drive bearing 184 and rotates within at least one of the first cavity 214 and/or the second cavity 216. In embodiments shown in FIGS. 13-16, the unloader assembly 172 may surround the eccentric body 162. For example, the flank surface 234 may be formed on the eccentric body 162 such that the unloader assembly 172 is rotationally engaged with the eccentric body 162 and the eccentric body 162 transmits a driving force on the unloader assembly 172. The flank surface 234, formed on the eccentric body 162, transmits a driving force onto the flank surface 290 of the unloader assembly 172. The driving force may be generally perpendicular (e.g., normal) to the flank surface 290.

In embodiments shown in FIGS. 1-12, the unloader assembly 172 is positioned axially between the main counterweight 246 and the lower counterweight 247. In embodiments shown in FIGS. 13-16, both the secondary counterweights 244, the main counterweight 246 and the lower counterweight 247, are positioned axially on one side of the unloader assembly 172. The relative placement of the unloader assembly 172, the main counterweight 246, and the lower counterweight 247, axially, angularly, and/or radially, may be selected to balance the forces on the driveshaft 138. Further, the weight, and/or the weight distribution, of the unloader assembly 172, the main counterweight 246, and the lower counterweight 247 may be adjusted (resized), e.g., the weights may be increased and/or decreased, in order to achieve compressor balance.

Figure 17:
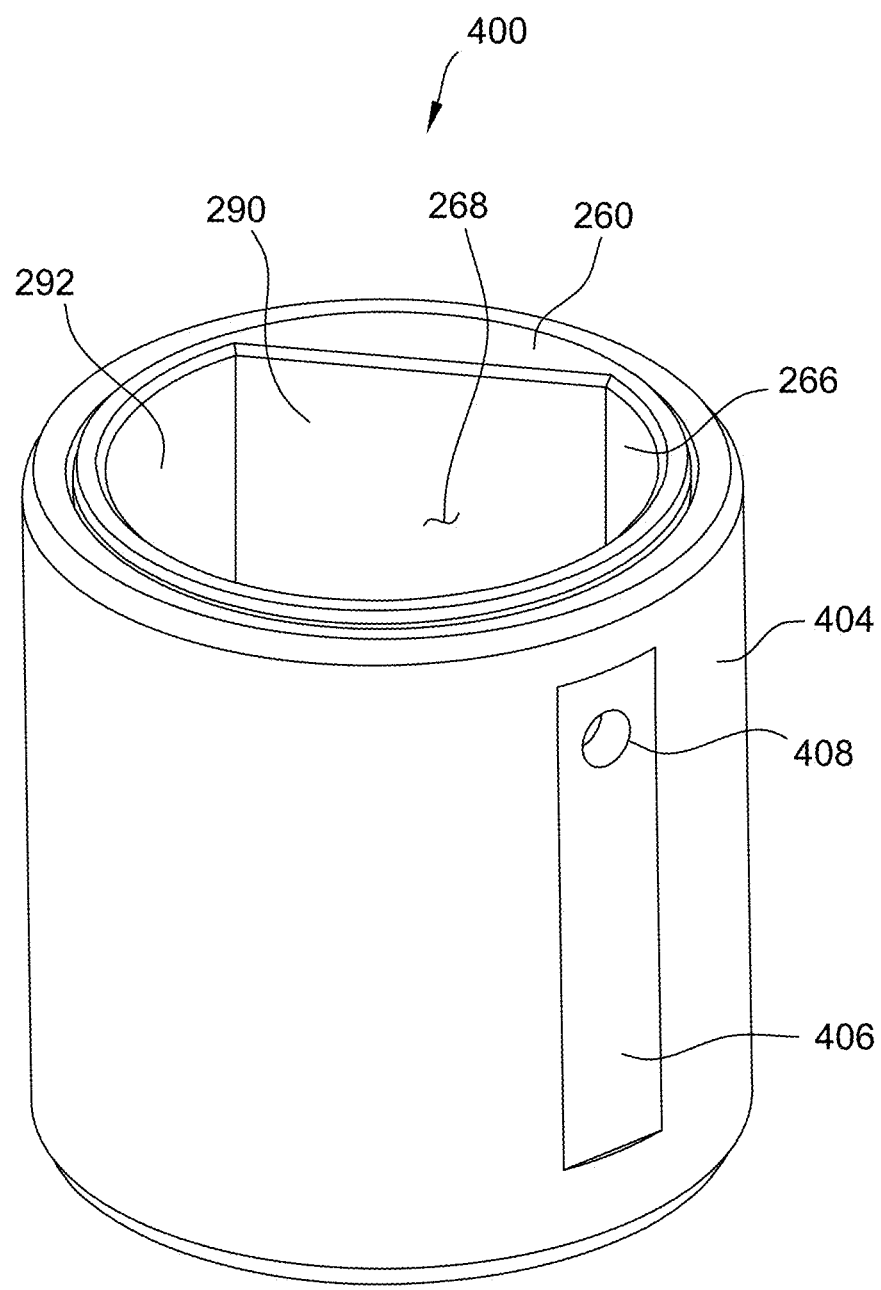
FIG. 17 is another embodiment of an unloader assembly.
Figure 18:
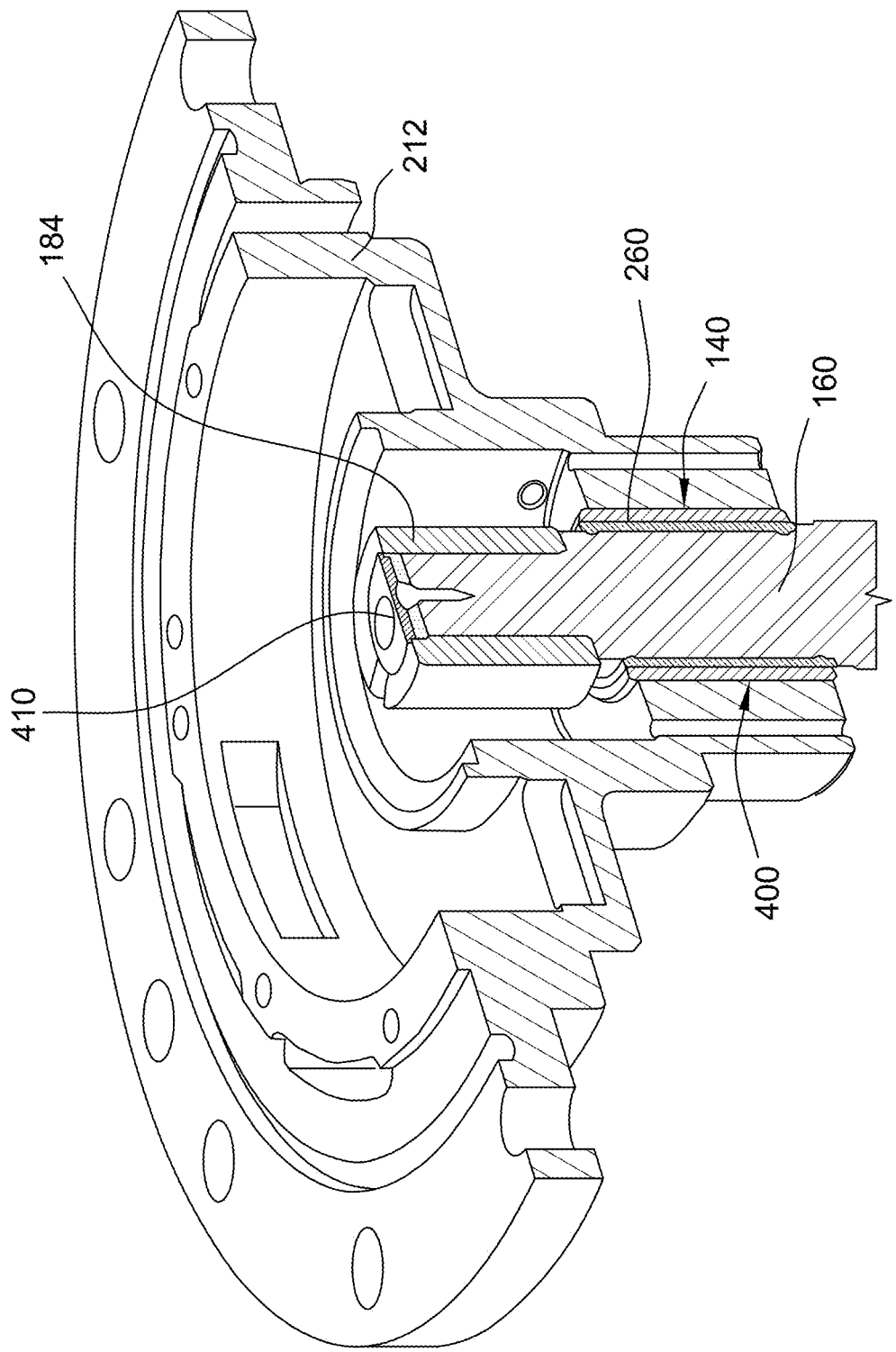
FIG. 18 is a first cross-section view of a drive assembly including the unloader assembly shown in FIG. 17.
Figure 19:
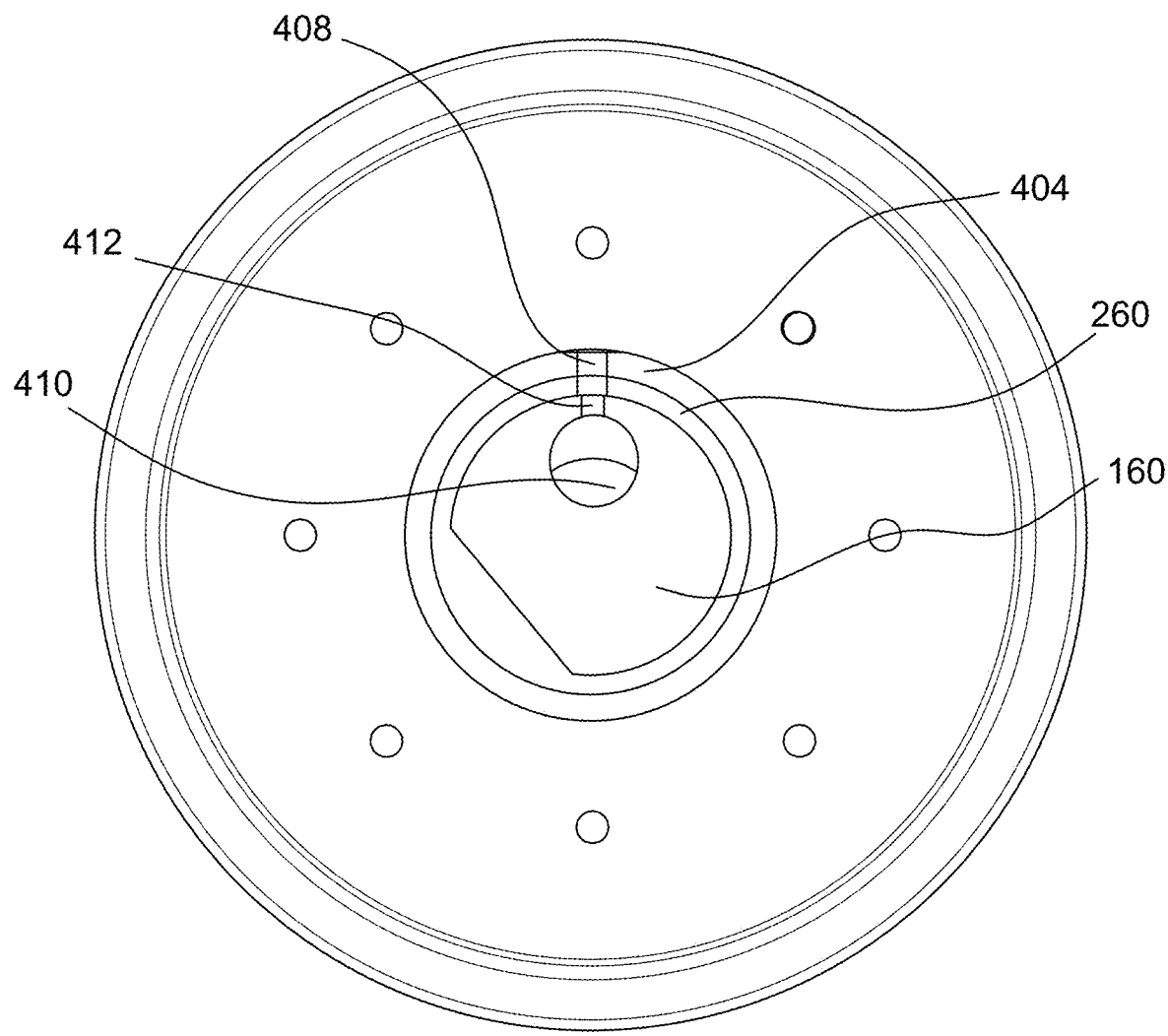
FIG. 19 is a second cross-section view of a drive assembly including the unloader assembly shown in FIG. 17.

Referring to FIGS. 17-19, an alternative embodiment of an unloader assembly 400 is shown. The unloader assembly 400 includes the unloader 260 and an unloader bearing 404. The unloader 260, as described above, is generally annular in shape having the outer secondary surface 264 and the inner surface 266 that defines the boundary of an unloader opening 268 extending through the unloader 260. The unloader opening 268 is sized and shaped to receive at least a portion of the driveshaft body 160 therein. The inner surface 266, defining the unloader opening 268, includes the flank surface 290 and the secondary surface 292, e.g., a cylindrical surface. At least a portion of the unloader 260 may be disposed within the bearing opening of the first bearing assembly 140.

The unloader bearing 404 is annular in shape and surrounds the outer secondary surface 264. The unloader bearing 404 may be connected to the unloader 260. The unloader bearing 404 may be composed of any material having suitable properties, such as Teflon, polymers, polyetheretherketone (PEEK), aluminum, Steel, bronze, and brass compositions, and/or powdered metal materials. The unloader assembly 400, including the unloader 260 and the unloader bearing 404, rotates together with rotations of the driveshaft body 160. The bearing unloader may include an outer radius that is less than the inner radius of the bearing surface 220. Accordingly, there is a clearance between the unloader bearing 404 and the bearing surface 220, and a hydrodynamic film may be generated by rotations of the driveshaft body 160 and the unloader assembly 400.

The unloader bearing 404, and/or the unloader 260, may include a lubricant delivery surface 406, that is generally planar, or recessed from the outer secondary surface of the bearing unloader and/or the unloader 260. The unloader assembly 400 may further include a lubricant delivery passage 408 extending through both the unloader bearing 404 and the unloader 260. The lubricant delivery passage 408 may extend all the way through the unloader assembly 400 and the driveshaft body 160 may include a longitudinal lubricant delivery passage 410 and a radial lubricant delivery passage 412 that radiates outward from the longitudinal lubricant delivery passage 410. Lubricant may be drawn axially through the longitudinal lubricant delivery passage and the lubricant, e.g., oil, may move radially outwards through the radial delivery passage 412. The radial delivery passage 412 may be aligned, e.g., axially, and circumferentially, with the lubricant delivery passage 408 on the unloader assembly 400.

The unloader 260 and the unloader bearing 404 may be a single component. For example, the exterior surface of the unloader 260 may be coated with a Teflon, or a PEEK composite, or other suitable coating, that reduces friction between the unloader assembly 400 and the bearing surface 220. The first bearing assembly 140 may be replaced by the unloader assembly 400.

Figure 20:
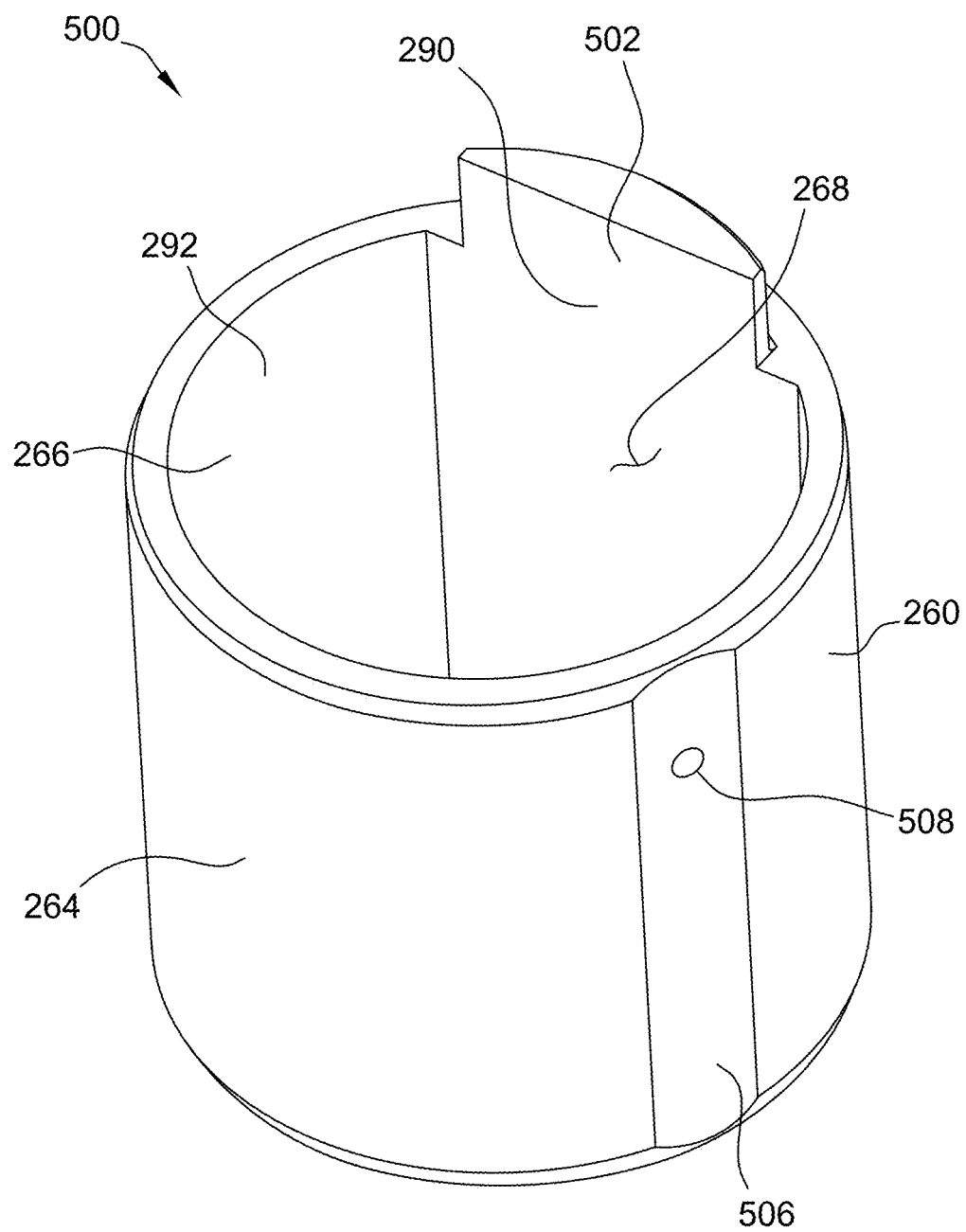
FIG. 20 is another embodiment of an unloader assembly.
Figure 21:
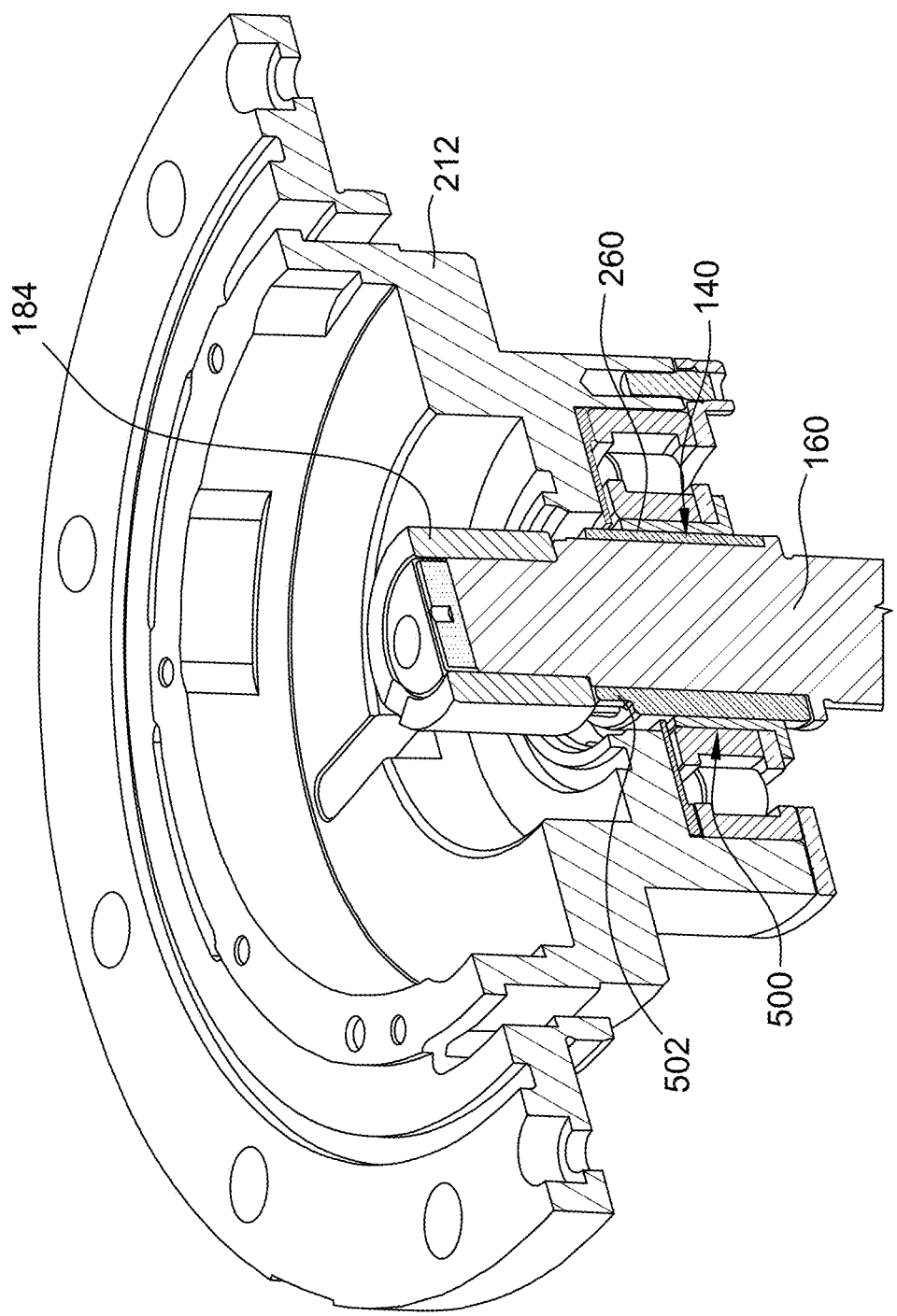
FIG. 21 is a cross-section view of a drive assembly including the unloader assembly shown in FIG. 20.

Referring to FIGS. 20-21, another embodiment of an unloader assembly 500 is shown. The unloader assembly 500 includes an unloader 260 and a retention tab 502. The retention tab 502 extends, axially, from either the first or second axial ends 270, 272 of the unloader 260. In the embodiment illustrated in FIGS. 20-21, the retention tab 502 may be in contact with the drive bearing 184 which restricts axial translations of the unloader assembly 500. The retention tab 502 may be in contact with, for example one or more additional components of the compressor 100, for example, the retention tab 502 may be in contact with drive bearing 184, restricting axial translation of the unloader assembly 500.

Unloader assembly 500 may further include an oil delivery surface 506, that is generally planar, or recessed from the outer secondary surface 264 of the unloader 260. The unloader assembly 500 may further include an oil delivery passage 508 extending through the unloader 260. The unloader assembly 400 and 500, may include the counterweight 262 extending radially outward from the unloader 260.

Embodiments of the systems and methods of the present disclosure achieve superior results as compared to prior systems and methods. For example, the driveshaft assembly, including an unloader assembly, has benefits over known driveshaft assemblies. The driveshaft assembly may be arranged in several arrangements, dependent on the rotational speed of the driveshaft, including at least one of a compliant arrangement and a constrained arrangement. In particular, at a first speed range, the unloader assembly and the driveshaft may be arranged in a compliant arrangement so that the orbiting and non-orbiting scroll flanks will be in contact having a scroll contact force. In the compliant arrangement, deflections of the driveshaft may be unloaded by relative motion between the driveshaft and the unloader assembly and a desired scroll contact force may be achieved. In a second speed range, greater than the first speed range, the unloader assembly and the driveshaft may be arranged in a constrained configuration and the scroll flanks are separated by a separation distance. In the constrained configuration, a pre-set separation distance between the non-orbiting scroll flank and orbiting scroll flank is achieved, while the restricted motion between the driveshaft and the unloader assembly is maintained, therefore friction between the non-orbiting scroll flank and the orbiting scroll flank is eliminated and noise is reduced in the second speed range. Embodiments described herein, including the unloader assembly, may compensate for misalignment or surface imperfections between the spiral wrap flank surfaces, improving compressor efficiency. For example, the unloader assembly may prevent or reduce leaks e.g., preventing fluid from escaping the moving fluid pockets prior to discharge, or additionally, and/or alternatively, preventing high pressure fluid from leaking into the lower pressure fluid pockets.

The unloader assembly, including the unloader bearing, may be composed of various types of materials, e.g., Teflon, PEEK, etc., enabling an operator to select an appropriate material for the unloader assembly that is best suited for the operating conditions of the compressor. The unloader assembly may be modular in that the unloader bearing, may be replaced with another unloader bearing having a different material, as needed. The modularity of the unloader assembly including the replaceable unloader bearing, reduces manufacturing costs. Further, the bearing unloader may replace the bearing reducing the number of parts.

When introducing elements of the present disclosure or the embodiment(s) thereof, the articles "a", "an", "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A driveshaft assembly comprising:
a bearing including an inner bearing surface;
a driveshaft having a longitudinal axis and having an outer surface, the outer surface including a flank surface and a secondary surface; and
an unloader assembly comprising:
an unloader including an inner surface and an outer surface, the outer surface is rotationally supported with the bearing inner surface and the inner surface includes a flank surface and a secondary surface, wherein the flank surface is slidably engaged with the flank surface of the driveshaft along a direction that is perpendicular to the longitudinal axis of the driveshaft; and
a counterweight connected to the unloader and extending radially outward relative to the unloader.

2. The driveshaft assembly of claim 1, wherein when a driveshaft speed increases in rotational speed from a first speed to a second speed, higher than the first speed, the flank surface of the unloader slides along the flank surface of the driveshaft, until the driveshaft reaches a transition speed, and when the driveshaft reaches the transition speed the unloader is restricted from sliding any further along the flank surface of the driveshaft.

3. The driveshaft assembly of claim 1, wherein at least one of the flank surface of the unloader and the flank surface of the driveshaft is curved.

4. The driveshaft assembly of claim 1, wherein the driveshaft is rotatable at a first speed range and a second speed range higher than the first speed range, wherein when the driveshaft is rotating at the first speed range the secondary surface of the driveshaft is not in contact with the secondary surface of the unloader, and when the driveshaft is rotating at the second speed range the secondary surface of the driveshaft is in contact with the secondary surface of the unloader assembly.

5. The driveshaft assembly of claim 1, wherein the driveshaft is drivingly engaged with an orbiting scroll that is meshed with a non-orbiting scroll, and wherein the driveshaft is rotatable at a first speed range and a second speed range higher than the first speed range, wherein when the driveshaft is rotating at the first speed range at least a portion of a scroll flank surface of a non-orbiting scroll contacts a scroll flank surface of an orbiting scroll, and when the driveshaft is rotating at the second speed range the scroll flank surface of the non-orbiting scroll and the scroll flank surface of the orbiting scroll are separated by a scroll separation distance.

6. The driveshaft assembly of claim 1, wherein the flank surface of the unloader and the flank surface of the driveshaft are slidably engaged along the direction that includes a chord of the driveshaft and aligned between a first and second radial end of the counterweight.

7. The driveshaft assembly of claim 1, wherein an inner radius of the secondary surface of the unloader assembly is between 0.01-2 mm greater than a radius of the secondary surface of the driveshaft.

8. The driveshaft assembly of claim 1, wherein a width of the flank surface of the driveshaft is less than a width of the flank surface of the unloader assembly along a chord direction that is perpendicular to a longitudinal axis of the driveshaft.

9. The driveshaft assembly of claim 1, wherein the unloader extends in an axial direction between a first axial end and a second axial end, wherein the counterweight is connected to at least one of the first axial end or the second axial end.

10. The driveshaft assembly of claim 1, wherein the counterweight extends radially outward from the unloader between a first circumferential position and a second circumferential position spanning an angle less than 180 degrees.

11. The driveshaft assembly of claim 1, wherein the unloader includes an outer radius and wherein the counterweight includes an outer radius, wherein the outer radius of the counterweight is 1.5-5 times greater than the outer radius of the unloader.

12. The driveshaft assembly of claim 1, wherein the secondary surface of the driveshaft is cylindrical and the secondary surface of the unloader is cylindrical.

13. A compressor comprising:
a shell;
a scroll assembly disposed within the shell, the scroll assembly comprising:
a non-orbiting scroll; and
an orbiting scroll; and
a driveshaft assembly comprising:
a bearing including an inner bearing surface;
a driveshaft having a longitudinal axis and having an outer surface, the outer surface including a secondary surface and a flank surface; and
an unloader assembly comprising:
an unloader including an inner surface and an outer surface, the outer surface is rotationally supported with the bearing inner surface and the inner surface includes a secondary surface and a flank surface, wherein the flank surface is slidably engaged with the flank surface of the driveshaft along a direction that is perpendicular to the longitudinal axis of the driveshaft; and
a counterweight connected to the unloader and extending radially outward relative to the unloader.

14. The compressor of claim 13, wherein the driveshaft is rotatable at a first speed range and a second speed range higher than the first speed range, wherein when the driveshaft is rotating at the first speed range at least a portion of a scroll flank surface of the non-orbiting scroll contacts a scroll flank surface of the orbiting scroll, and when the driveshaft is rotating at the second speed range, the scroll flank surface of the non-orbiting scroll and the scroll flank surface of the orbiting scroll are separated by a scroll separation distance.

15. The compressor of claim 13, wherein when the driveshaft increases in rotational speed from a first speed to a second speed higher than the first speed, the flank surface of the unloader slides along the flank surface of the driveshaft, until the driveshaft reaches a transition speed, and when the driveshaft reaches the transition speed the unloader is restricted from sliding any further along the flank surface of the driveshaft.

16. The compressor of claim 13, wherein at least one of the flank surface of the unloader and the flank surface of the driveshaft is curved.

17. The compressor of claim 13, wherein the driveshaft is rotatable at a first speed range and a second speed range higher than the first speed range, wherein when the driveshaft is rotating at the first speed range the secondary surface of the driveshaft is not in contact with the secondary surface of the unloader, and when the driveshaft is rotating at the second speed range the secondary surface of the driveshaft is in contact with the secondary surface of the unloader assembly.

18. The compressor of claim 13, wherein the flank surface of the unloader and the flank surface of the driveshaft are slidably engaged along the direction that includes a chord of the driveshaft and that is aligned between a first and second radial end of the counterweight.

19. A method of assembling a driveshaft assembly for rotating an orbiting scroll relative to a non-orbiting scroll:
inserting a bearing assembly that defines a bearing opening, within an opening defined within a first hub;
inserting an unloader of an unloader assembly within the bearing opening such that a counterweight of the unloader assembly is disposed outside of the bearing opening; and
inserting a driveshaft within an unloader opening defined by the unloader assembly, wherein a flank surface of the driveshaft is in contact with a flank surface of the unloader, and wherein a secondary surface of the driveshaft is arranged in proximity to a secondary surface of the unloader.

20. The method of claim 19, wherein the driveshaft is rotatable at a first speed range and a second speed range higher than the first speed range, wherein when the driveshaft is rotating at the first speed range at least a portion of a scroll flank surface of the non-orbiting scroll contacts a scroll flank surface of the orbiting scroll, and when the driveshaft is rotating at the second speed range the scroll flank surface of the non-orbiting scroll and the scroll flank surface of the orbiting scroll are separated by a scroll separation distance.

21. A driveshaft assembly comprising:
a bearing including an inner bearing surface;
a driveshaft having a longitudinal axis and having an outer surface, the outer surface including a flank surface and a secondary surface; and
an unloader assembly comprising:
an unloader including an inner surface and an outer surface, the outer surface is rotationally supported with the bearing inner surface and the inner surface surrounds the driveshaft, wherein the unloader moves relative to the driveshaft when the driveshaft is rotating in a first speed range; and
a counterweight connected to the unloader and extending radially outward relative to the unloader.

* * * * *